United States Patent
Smith et al.

(10) Patent No.: US 6,184,823 B1
(45) Date of Patent: Feb. 6, 2001

(54) GEOGRAPHIC DATABASE ARCHITECTURE FOR REPRESENTATION OF NAMED INTERSECTIONS AND COMPLEX INTERSECTIONS AND METHODS FOR FORMATION THEREOF AND USE IN A NAVIGATION APPLICATION PROGRAM

(75) Inventors: Nicholas E. Smith, Oak Park, IL (US); Richard A. Ashby, Blue River, WI (US); Vijaya Israni, Hoffman Estates, IL (US)

(73) Assignee: Navigation Technologies Corp., Rosemont, IL (US)

( * ) Notice: Under 35 U.S.C. 154(b), the term of this patent shall be extended for 0 days.

(21) Appl. No.: 09/071,721

(22) Filed: May 1, 1998

(51) Int. Cl.[7] .............................. H04B 7/185; G01S 5/02
(52) U.S. Cl. ..................... 342/357.13; 701/208; 701/209
(58) Field of Search ....................... 342/357.13; 701/208, 701/209; 340/990

(56) References Cited

U.S. PATENT DOCUMENTS

| | | |
|---|---|---|
| 4,937,752 | 6/1990 | Nanba et al. . |
| 5,185,161 | 2/1993 | Emmerink et al. . |
| 5,231,584 | 7/1993 | Nimura et al. . |
| 5,802,492 | * 9/1998 | DeLorme et al. ................... 340/990 |

* cited by examiner

Primary Examiner—Theodore M. Blum
(74) Attorney, Agent, or Firm—Frank J. Kozak; Laurence M. Kaplan

(57) ABSTRACT

An architecture for a geographic database that supports the identification and use of names for intersections of roads located in a geographic region, and methods for use and formation thereof. The geographic database includes data that represent components of a road network in a geographic region. The geographic database includes a first plurality of data entities each of which represents an intersection of roads in the road network and a second plurality of data entities each of which represents a name of one of the components of the road network. The geographic database includes a third plurality of data entities each of which associates one of the first plurality of data entities with one of the second plurality of data entities. The third plurality of data entities are referenced by other data entities in the geographic database and by indices to allow a navigation application program using the geographic database to identify intersections of roads in the geographic region by name and to use the name of an intersection for the purpose of location identification and route guidance. Also disclosed is an improved process for forming substitute data records to represent complex physical geographic features thereby facilitating operation of a navigation system by reducing processing requirements for certain functions.

34 Claims, 16 Drawing Sheets

GEOGRAPHIC DATABASE ARCHITECTURE FOR REPRESENTATION OF NAMED INTERSECTIONS AND COMPLEX INTERSECTIONS AND METHODS FOR FORMATION THEREOF AND USE IN A NAVIGATION APPLICATION PROGRAM

REFERENCE TO MICROFICHE APPENDIX

Included with and forming part of this specification is microfiche appendix compressing 1 sheet of 51 total frames.

REFERENCE TO COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a system and method for facilitating access to and use of geographic data used with a navigation application program that provides navigating features and functions to an end-user, and more particularly, the present invention relates to a geographic database, and an architecture therefor, that provides for the identification and use of named intersections so that a navigation application program using the geographic database can accommodate identification and use of named intersections thereby facilitating certain functions for an end-user of the navigation application program and enhancing performance of the navigation system. The present invention also relates to an improved process for forming substitute data records to represent complex physical geographic features, thereby facilitating operation of a navigation system by reducing processing requirements for certain functions.

Computer-based navigation application programs are available that provide end-users (such as drivers of vehicles in which the navigation systems are installed) with various navigating functions and features. For example, some navigation application programs are able to determine an optimum route to travel by roads between locations in a geographic region. Using input from an end-user, and optionally from equipment that can determine one's physical location (such as a GPS system), a navigation application program can examine various routes between two locations to determine an optimum route to travel from a starting location to a destination location in a geographic region. The navigation application program may then provide the end-user with information about the optimum route in the form of instructions that identify the maneuvers required to be taken by the end-user to travel from the starting location to the destination location. If the navigation system is located in an automobile, the instructions may take the form of audio instructions that are provided along the way as the end-user is traveling the route. Some navigation application programs are able to show detailed maps on computer displays outlining routes to destinations, the types of maneuvers to be taken at various locations along the routes, locations of certain types of features, and so on.

In order to provide these and other navigating functions, the navigation application program uses one or more detailed databases that include data which represent physical features in a geographic region. The detailed database may include data representing the roads and intersections in a geographic region and also may include information relating to the represented the roads and intersections in a geographic region, such as turn restrictions at intersections, speed limits along the roads, street names of the various roads, address ranges along the various roads, and so on.

One difficulty in providing geographic data for use by a navigation application program relates to the efficient utilization of the available computer resources of the navigation system on which the navigation application program is run. Computerbased navigation application programs are provided on various platforms including some with relatively limited computer hardware resources. For example, navigation systems may be located in vehicles or may be hand-held. These types of navigation systems may have relatively limited computer resources, such as limited memory and relatively slow I/O. In order to provide a high a level of functionality in such systems, it is required that the available computer resources be used efficiently.

The limited resources of some navigation systems can affect the ability of these types of navigation systems to provide desired functions, especially when using a geographic database that includes a relatively high level of detail. For example, a geographic database can include data that accurately represent all the physical geographic features that form a complex intersection in a geographic region, including all the ramps, entrances, exits, internal pathway links (and geographic coordinates thereof), turn restrictions between links, speed limits, and so on. However, for some complex intersections, a relatively large amount of data is necessary to represent all the actual physical features of the intersection. Handling such large amounts of data may adversely affect the performance of navigation systems with limited resources.

Another consideration related to the use of geographic data by navigation systems is that given the relatively large size of the geographic database necessary to provide a desired level of functionality to the end-user, all the data records for an entire geographic region cannot be loaded into the memory of the navigation system at the same time. This is especially true for navigation system platforms with limited resources, such as systems installed in vehicles or hand-held systems. Due to the limited memory resources of these navigation systems, it is necessary to load geographic data as needed from a storage medium, such as a CD-ROM disk, into the memory of the navigation system for use by the navigation application program. Unfortunately, as mentioned above, in these types of systems, I/O access from a storage medium may also be relatively slow. Thus, the relatively limited memory resources combined with the relatively slow I/O can limit the performance of some types of navigation systems, resulting in slow response. Aside from being undesirable, slow response in a navigation system may render the system useless for its intended purpose in certain circumstances. For example, if the navigation system is installed in a vehicle, the driver may require information from the navigation system about a desired route in a matter of seconds in order to utilize the information while driving. If the navigation system requires more than several seconds to calculate a route, the driver may have moved beyond the point at which the routing information provided by the navigation system is relevant. Therefore, it is important that navigation systems operate efficiently in order to provide navigating information relatively quickly.

Navigation application programs may also be run on computer platforms that have in general greater memory resources and faster I/O, such as personal computers networks. Although these systems may have more and faster resources, the considerations related to the efficient use of geographic data still apply, but on a larger scale. With these types of systems, even greater functionality can be provided if the limitations imposed by memory size and I/O are minimized.

Techniques have been devised or implemented to improve navigation system performance by organizing, structuring, or arranging the geographic database or the data in the database in particular ways. Because a navigation system uses geographic data in certain known and expected ways to perform known functions, the geographic data can be organized, structured, or arranged in a manner that facilitates their use in these known ways by the navigation system.

When an end-user uses a navigation system to find a route between a starting destination and a desired destination, the end-user may be required to provide input to the navigation system identifying the desired destination (and possibly a starting location). The navigation system may provide suitable user-interface hardware, such as a keypad, a keyboard, a touch-sensitive screen, voice recognition equipment, and so on, by which the end-user may input this information to the navigation system. The navigation application also includes suitable user-interface program that enables the end-user to identify the desired destination or starting location to the navigation system. Navigation system programming may provide various ways by which the end-user can identify the desired destination or starting location. One way that an end-user may identify a desired location to the navigation system is by street address. If the navigation system uses a positioning system, such as a GPS system or a dead-reckoning system, to determine a present position, the starting location of a route may be obtained from the positioning system. After a starting position and a desired destination have been identified to the navigation system, appropriate programming in the navigation system calculates one or more routes between these two locations.

A potential disadvantage of requiring an end-user to identify a desired destination location by street address is that the end-user may not know the street address of the desired destination. For example, an end-user may want the navigation system to determine a route to a museum but does not know the street address of the museum.

Some navigation systems allow an end-user to identify a destination by means other than a street address. An end-user may identify a desired destination location or starting location to the navigation system by first querying the navigation system for a particular known point-of-interest by name or type and then selecting the desired point-of-interest from a result set provided by the navigation system to the end-user. In order to provide these kinds of features to an end-user, the navigation system may use a oeographic database that supports these kinds of searches.

By providing this kind of functionality, navigation systems can provide useful features to end-users. However, there is still a need for improvement. One area in which there exists a need for improvement is in accommodating different ways by which locations are identified or used. In many geographic regions, people have developed different ways to identify locations and to provide directions to locations. in many regions, it is common to refer to well known intersections by name. The intersection name may be an official name or may be a name that has developed over the years by common usage. One kind of intersection that is commonly named is a roundabout. Also, intersections of two or more interstate highways are sometimes referred to by name. Although an end-user's desired destination may not be located exactly at such a named intersection, an end-user may want a navigation system to provide directions to such an intersection. Accordingly, it is desired that a navigation system provide a way to accommodate the identification of intersections by name.

It is an objective therefore to provide an improved means by which navigation systems can accommodate use by end-users. It is also an objective to provide improvements in the storage or use of geographic data that improves performance in a navigation system. Similarly, it is a further objective to develop navigation functions that can exploit the geographic database in improved ways.

SUMMARY OF THE INVENTION

To address the above concerns, according to one aspect of the present invention, there is provided a geographic database, and an architecture therefor, that supports the identification and use of names for intersections of roads located in a geographic region. The geographic database includes data that represent components of a road network in a geographic region. The geographic database includes a first plurality of data entities each of which represents an intersection of roads in the road network and a second plurality of data entities each of which represents a name of one of the components of the road network. The geographic database includes a third plurality of data entities each of which associates one of the first plurality of data entities with one of the second plurality of data entities. The third plurality of data entities are referenced by other data entities in the geographic database and by indices to allow a navigation application program using the geographic database to identify intersections of roads in the geographic region by name and to use the name of an intersection for the purpose of location identification and route guidance. According to another aspect there is provided a method for operating a navigation application program that allows for the identification and use of names for intersections.

DETAILED DESCRIPTION OF THE PRESENTLY PREFERRED EMBODIMENTS

I. NAVIGATION SYSTEM—OVERVIEW

Figure 1:
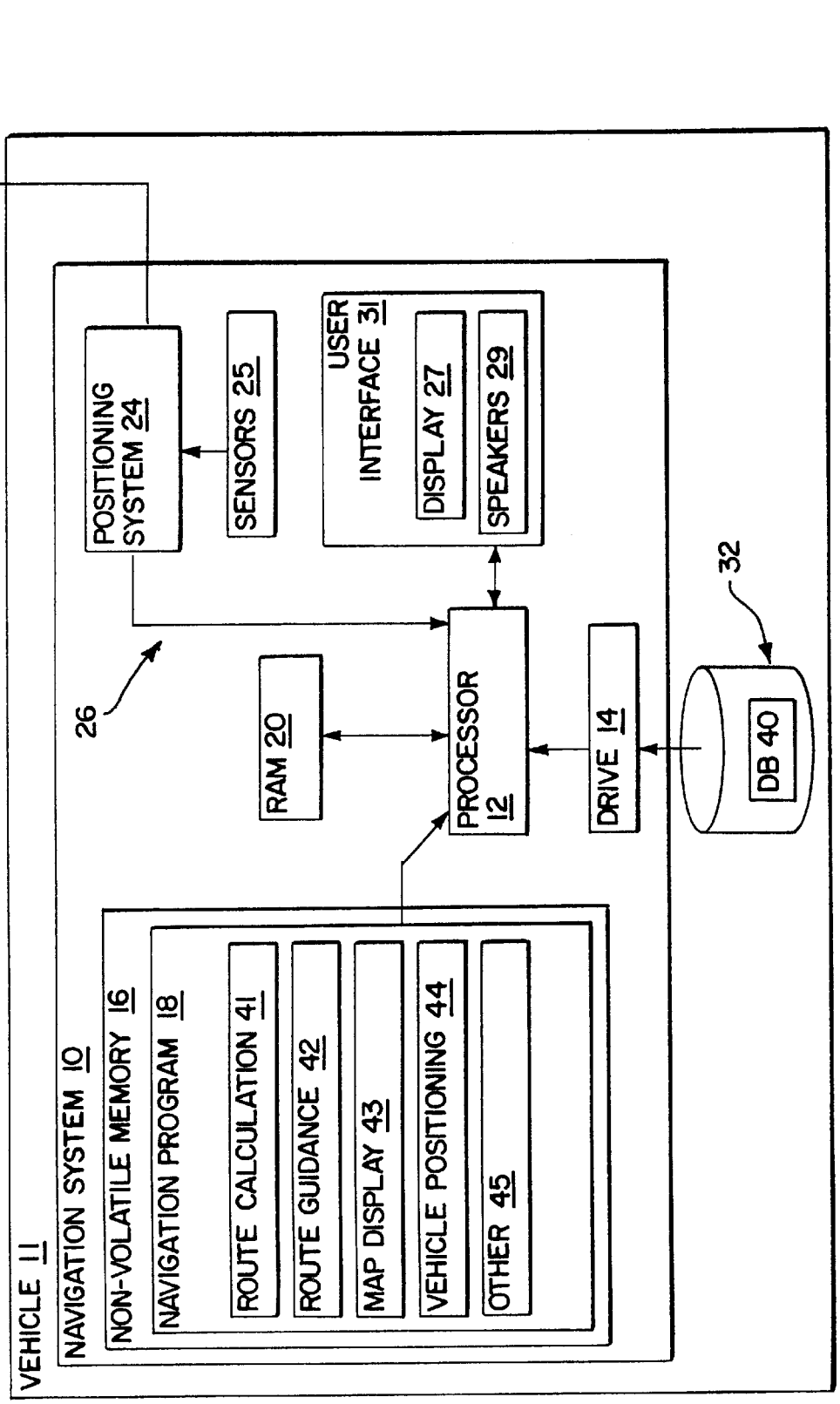
FIG. 1 is a block diagram illustrating a navigation system.

Referring, to FIG. 1, there is a block diagram of a navigation system 10. The navigation system 10 is installed in a vehicle 11 such as a car or truck, although in alternative embodiments, the niavigation system 10 may be located outside of a vehicle or may be implemented in various other platforms or environments, as described below.

Referring to the embodiment illustrated in FIG. 1. the navigation system 10 is a combination of hardware and software components. In one embodiment, the navigation system 10 includes a processor 12, a drive 14 connected to the processor 12, and a non-volatile memory storage device 16 for storing a navigation application software program 18 and possibly other information. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, may also be suitable.

The navigation system 10 may also include a positioning system 24. The positioning system 24 may utilize GPS-type technology, a dead reckoning-type system, or combinations of these, or other systems, all of which are known in the art. The positioning system 24 may include suitable sensing devices 25 that measure the traveling distance speed, direction, and so on, of the vehicle. The positioning system 24 may also include appropriate technology to obtain a GPS signal, in a manner which is known in the art. The positioning system 24 outputs a signal 26 to the processor 12. The signal 26 may be used by the navigation application software 18 that is run on the processor 12 to determine the location, direction, speed, etc., of the navigation system 10.

The navigation system 10 also includes a user interface 31. The user interface 31 includes appropriate equipment that allows the end-user to input information into the navigation system. This input information may include a request to use the navigation features of the navigation system. For example, the input information may include a request for a route to a desired destination. The input information may also include other kinds of information. The equipment used to input information into the navigation system may include a keypad, a keyboard, a microphone, etc., as well as appropriate software, such as a voice recognition program. The user interface 31 also includes suitable equipment that provides information back to the end-user. This equipment may include a display 27, speakers 29, or other means.

The navigation system 10 uses a map database 40 stored on a storage medium 32. The storage medium 32 is installed in the drive 14 so that the map database 40 can be read and used by the navigation system. The storage medium 32 may be removable and replaceable so that a storage medium with an appropriate map database for the geographic region in which the vehicle is traveling can be used. In addition, the storage medium 32 may be replaceable so that the map database 40 on it can be updated easily. In one embodiment, the geographic data may be published by Navigation Technologies of Sunnyvale, Calif.

In one embodiment, the storage medium 32 is a CD-ROM disk. In an alternative embodiment, the storage medium 32 may be a PCMCIA card in which case the drive 14 would be substituted with a PCMCIA slot. Various other storage media may be used, including fixed or hard disks, DVD (digital video disks) or other currently available storage media, as well as storage media that may be developed in the future. The storage medium 32 and the geographic database 40 do not have to be physically provided at the location of the navigation system. In alternative embodiments, the storage medium 32, upon which some or all of the geographic data 40 are stored, may be located remotely from the rest of the navigation system and portions of the geographic data provided via a communications link, as needed.

The navigation application software program 18 is loaded from the non-volatile memory 16 into a RAM 20 associated with the processor 12 in order to operate the navigation system. The navigation system 10 uses the map database 40 stored on the storage medium 32, possibly in conjunction with the output 26 from the positioning system 24, to provide various navigation features and functions. The navigation application software program 18 may include separate applications (or subprograms) that provide these various navigation features and functions. These functions and features may include route calculation 4 1, route guidance 42 (wherein detailed directions are provided for reaching a desired destination), map display 43, vehicle positioninig 44 (e.g., map matching), and other functions 45.

II. THE GEOGRAPHIC MAP DATABASE

A. Overview.

In one present embodiment, the speed and/or functionality of a navigation system can be enhanced by a combination that includes improvements in the storage, arrangement, and/or structuring of the geographic data used by the system to facilitate the use of the data by some of the functions in the navigation application program in the systems that use the data. Based upon the manner in which the geographic data are stored, arranged, and/or structured, functions in the navigation application program that access and use the data can implement routines that exploit the improvements incorporated into the geographic data. This combination can result in overall improved performance by the navigation system.

The map database 40 contains information about the roadway network in the geographic region. In one embodiment, the map database 40 includes node data and segment data. These data represent components of the physical road network. Node data represent physical locations in the geographic region (such as roadway intersections and other positions) and segment data represent portions of roadways between the physical locations represented by nodes. Each road segment in the geographic region is represented by a road segment data entity (i.e., a record) in the map database 40. Each road segment data record in the map database is associated with two nodes which represent the coordinate positions at each end of the road segment represented by the road segment data record. The information included in the node and segment data entities is explained with reference to FIGS. 2–4. (The terms "nodes" and "segments" represent only one terminology for describing these physical geographic features and other terminology for these features is intended to be encompassed within the scope of these concepts.)

Figure 2:
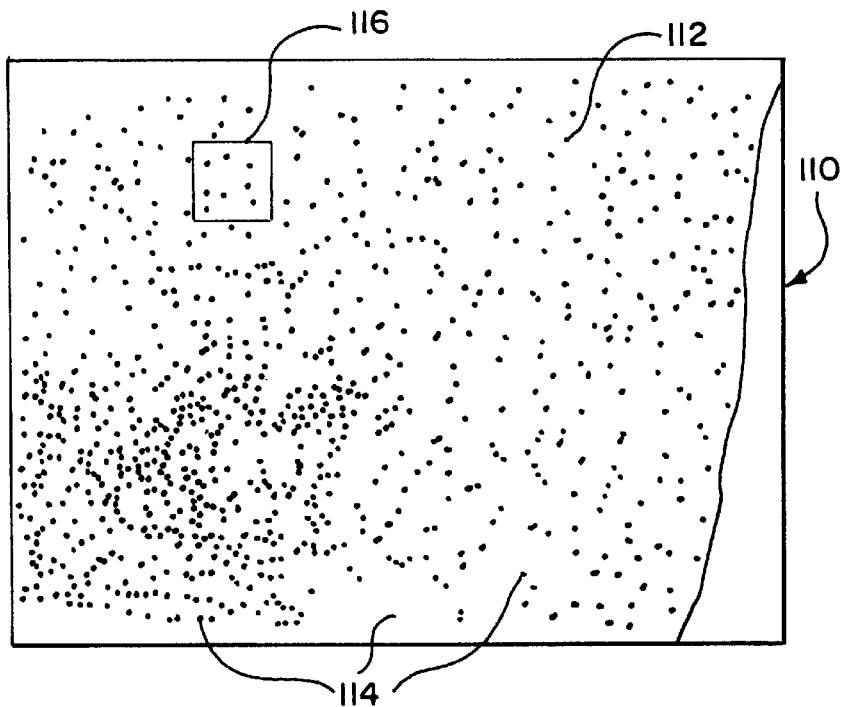
FIG. 2 illustrates a map showing a geographic region represented by the geographic database of FIG. 1.

FIG. 2 illustrates a map 110 showing a geographic region 112. A plurality of locations 114 are shown to be located in the geographic region 112. Each of the locations 114 represents a place or point in the geographic area 112 at which there is located a feature about which it is desired to include information in a geographic database. Each of these locations 114 has a unique physical location (latitude, longitude, and optionally absolute or relative altitude) and each of the locations 114 can be uniquely identified by its two dimensional (or three dimensional) geographic coordinates, (i.e., latitude, longitude, and optionally altitude). A location 114 may correspond to an intersection at which two or more roads meet, a point along a road segment at which the direction of the road changes, a point along a road segment at which the speed limit changes, a point at which a road reaches a dead end, and so on. The location 114 may correspond to a position of a point-of-interest, such as a hotel or civic center, a boundary of a natural feature, such as a lake, or a position along a railroad track or ferry. The locations 114 may correspond to anything physically located in the geographic area 112.

Figure 3:
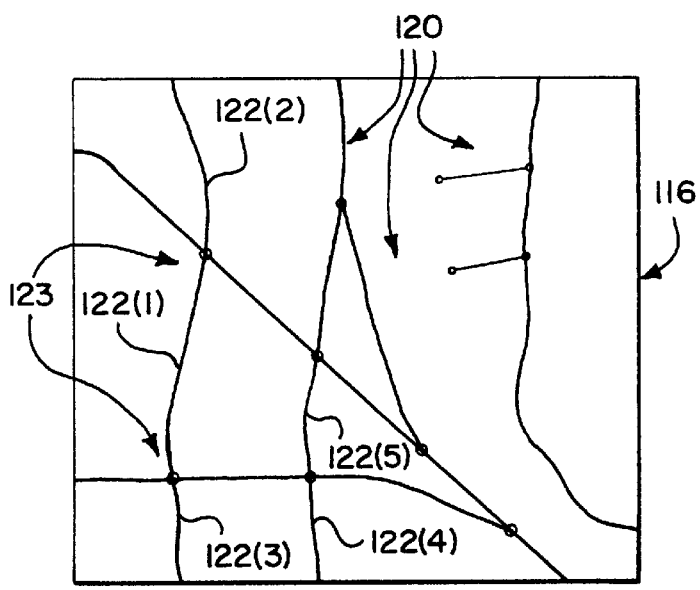
FIG. 3 shows an expanded view of a portion of the map of FIG. 2.
Figure 4:
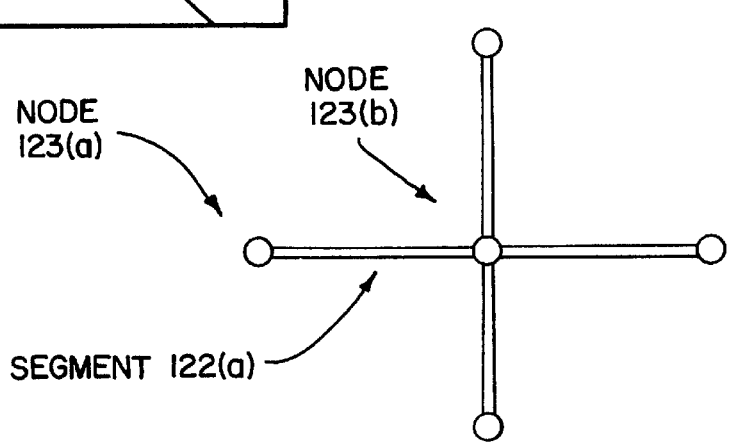
FIG. 4 is an illustration of single road segments shown in the maps of FIGS. 2 and 3.

FIG. 3 shows an expanded view of a portion 116 of the map 110. The portion 116 in FIG. 3 illustrates part of the road network 120 in the geographic region 112. The road network 120 includes, among other things, roads and intersections located in the geographic region 112. As shown in FIG. 3 in the illustrated portion 116 of the map 110, each road in the geographic region 112 is composed of one or more segments, 122(1), 122(2) . . . 122(n). In one embodiment, a road segment represents a portion of the road. In FIG. 3, each road segment 122 is shown to have associated with it two nodes 123: one node represents the point at one end of the road segment and the other node represents the point at the other end of the road segment. A single road segment 122 and its two associated nodes 123(*a*) and 123(*b*) are illustrated in FIG. 4. The node at either end of a road segment may correspond to a location at which the road meets another road, e.g., an intersection, or where the road dead ends.

In one type of geographic database, there is at least one database entry (also referred to as "entity" or "record") for each road segment represented in a geographic region. This road segment data record may have associated with it information (such as "attributes", "fields", etc.) that allows identification of the nodes associated with the road segment and/or the geographic positions (e.g. the latitude and longitude coordinates) of the two nodes. In addition, the road segment record may have associated with it information (e.g., more "attributes", "fields", etc.), that specify the speed of travel on the portion of the roadway represented by the road segment record, the direction of travel permitted on the road portion represented by the road segment record, what if any turn restrictions exist at each of the nodes which correspond to intersections at the ends of the road portion represented by the road segment record, the street address ranges of the roadway portion represented by the road segment record, the name of the road, and so on. Each segment data entity that represents an other-than-straight road segment may include one or more shape point data attributes that define the other-than-straight shape of the road segment. The various attributes associated with a road segment may be included in a single road segment record, or preferably are included in more than one type of road segment record which are cross-referenced to each other.

In a geographic database that represents the region 112, there may also be a database entry (entity or record) for each node in the geographic region. The node data record may have associated with it information (such as "attributes", "fields", etc.) that allows identification of the road segment(s) that connect to it and/or its geographic position (e.g., its latitude and longitude coordinates).

B. Separate Subsets of Geographic Data

One way that the accessing of geographic data can be enhanced for performing various navigation functions is to provide separate collections or subsets of the geographic data for use by each of the separate functions (e.g., 41–45) in the navigation application program 18. Each of these separate subsets is tailored specifically for use by one of the functions. For instance, the route calculation function 41 (in FIG. 1) normally uses only a portion of all the information in the geographic database that is associated with a segment of a road. When the route calculation function 41 is being run, it may require information such as the speed along a road segment, turn restrictions from one road segment to another, and so on. However, the route calculation function 41 does not necessarily require the name of the road to calculate a route. Similarly, when using the map display function 43, some of the information associated with a road segment, such as the speed limits or turn restrictions, is not required. Instead, when the map display function 43 is run, it uses only a portion of the information associated with the road segment, such as the shapes and locations of roads, and possibly the names of the roads. Even further, when the route guidance function 42 is being run, some of the information associated with a segment of a road, such as the speed and turn restrictions, is not required. Instead, when the route guidance function 42 is being run, it uses information that includes the name of the road represented by the road segment, the address range along the road segment, any signs along the road segment, and so on. Although there may be some overlap as to the types of information used by the various navigation functions, some of the data used by any one of these navigation functions is not used by another of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

In order to provide the information in the geographic database in a format more efficient for use by each of the navigation functions, separate subsets of the entire geographic database for a given geographic region are provided for each of the different types of navigation functions to be provided in the navigation application program 18.

Figure 5:
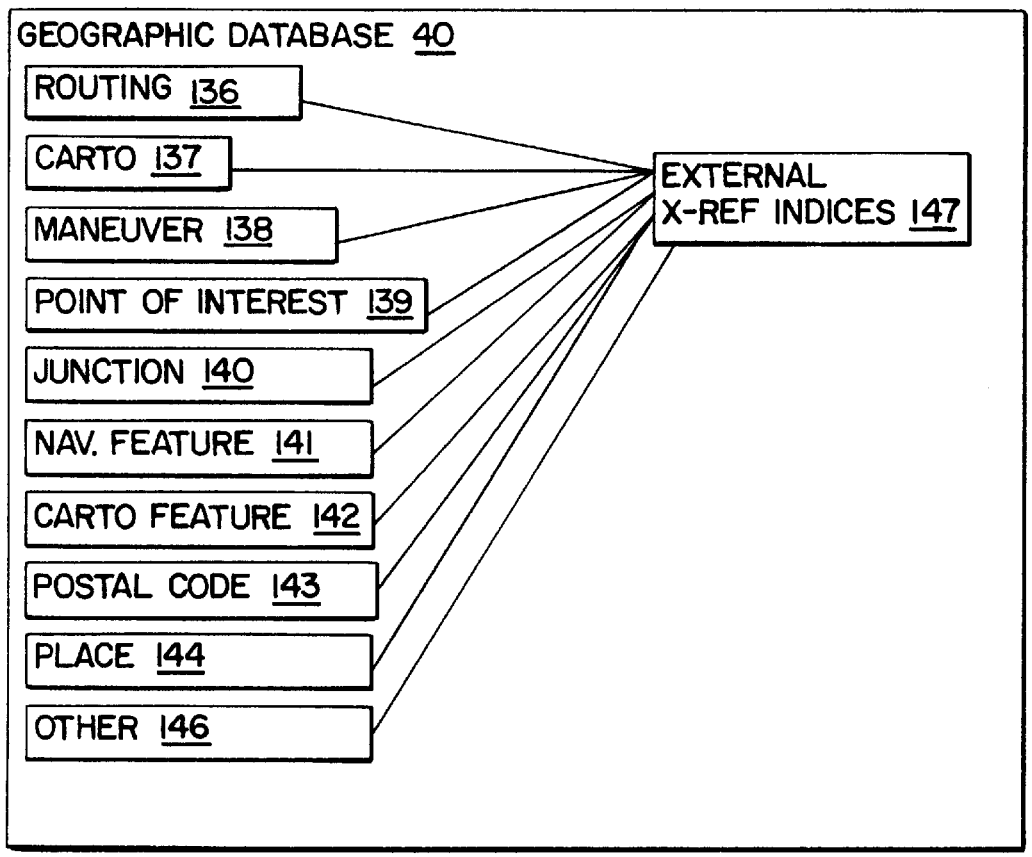
FIG. 5 is a diagram illustrating the different types of data included in the geographic database of FIG. 1 for use with various navigation application functions.

FIG. 5 illustrates the geographic database 40 comprised of separate routing data 136, cartographic data 137 (for map display), maneuver data 138 (for route guidance), point-of-interest data 139 (for identifying specific points of interest, such as hotels, restaurants, museums, stadiums, airports, etc.), and junction data 140 (for identifying named intersections, as explained further below). In addition to these types of data, the geographic database 40 may include navigation feature data 141 and cartographic feature data 142. These subsets of data include, respectively, the names of the navigable features (such as roads) and non-navigable features, such as lakes, etc. The geographic database may also include data subsets for places 144 (e.g., cities, states, counties) and postal codes 143. A geographic database may be defined with fewer or more subsets than these, and other types of data 146 may be defined and included.

Each subset of data includes only the data required to be used by a particular navigation function. There is some overlap of data between each of these subsets, with the result that some parts of the information may be included in more than one subset. For example, both the road segment data entity in the routing data subset 136 as well as the road segment data entity in the cartographic data subset 137 may include attributes identifying the nodes located at the ends of the segments. Although this duplication may result in a larger overall data storage requirement, each of the navigation functions benefits from the resultant efficiency of handling smaller amounts of data.

Providing for separate subsets of Geographic data for each of the navigation functions also takes into account that usage of each of these navigation functions relates to the others of the navigating functions in expected ways. For example, an end-user may first want to view a present position, then enter a destination, then receive instructions how to start toward the destination, then observe a map showing the initial portion of the route, then receive further instructions, then have a map displayed of the next portion of the route, and so on. Because of this type of expected usage, dividing the data into subsets provides for efficient use of the data when using each separate function.

Although the division of the geographic data into subsets provides for efficient use of the data by each of the different navigation functions, it becomes necessary to provide that the different navigating functions that use these different subsets of the database work together. For example, in the example mentioned above, after an end-user obtains a calculated route, it may be desired to display a map on a computer display with the calculated route highlighted. In order to accomplish this, the routing subset 136 of geographic data is accessed first to obtain the routing road segment data entities for the optimum route, and then the cartographic subset 137 of the geographic database is accessed to obtain the cartographic road segment data entities corresponding to the routing data entities. To permit these data subsets to work together, indices may be included that provide cross references, search trees, or other data finding techniques. Indices can be located within any of the subsets of data or external of any of the subsets. In FIG. 5, external indices 147 are shown. Storing indices external of the data that are being indexed has the advantage that the index can be loaded and used to determine which data among the various subsets of data needs to be loaded next.

C. Layering of Geographic Data

Another way that the geographic data can be organized to enhance their use is to provide the data in layers. Some of the navigation functions, such as the map display function and the route calculation functions, may use data at different levels of detail. For example, when using the map display function, it is sometimes desired to provide for panning and zooming. Zooming can be done more efficiently if the data are organized into layers, with greater detail at the lower layers and less detail at the higher layers. When using the route calculation function, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments to be investigated when calculating the route. Therefore, within some of the subsets of data types, the geographic data are provided in separate collections or groups corresponding to separate layers.

To implement layering, each road segment data record in the map database 40 also identifies the rank of the corresponding portion of the roadway that it represents. A rank of a road segment may correspond to its functional class. Road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Roads having a rank of "0" can handle the lowest volumes. For example, these roads lowest ranked roads may include side streets, alleyways, etc.

The rank of a road segment data entity also specifies the highest data layer in which a road segment entity is included. For example, referring to FIG. 6, the routing type data 136 may include five separate layers of the data, R0, R1, R2, R3, and R4, each comprising a separate collection of the routing data with a different level of detail, which can be used by the route calculation function. In the routing data type of the geographic database, layer 0 ("R0") includes the road segment data entities (and some or all of their corresponding routing data attributes) having a rank of "0" or higher. Thus, layer 0 includes road segment data entities corresponding to all the portions of all the roads in the geographic region. Layer 1 of the routing data 137 comprises a separate subset (or collection) of the routing, data and includes only the routing segment data entities (and some or all of their corresponding routing data attributes) having a rank of "1" or higher. Layer 2 of the routing data comprises a separate subset of the routing data and includes only the routing segment data entities (and some or all of their corresponding navigation data attributes) having a rank of level 2 or higher, and so on. A highest layer (layer n) includes only records having a rank of n. In a present embodiment, n is equal to 4, although in other embodiments, n may be any number greater than 0. Each higher layer includes fewer records, however these records represent roads upon which travel is generally faster.

Similarly, the other types of data, such as the cartographic subset type 137 may include separate collections of the data, each with a different level of detail, which can be used by the map display function. Using these different layers of cartographic data, the map display function can provide rapid panning and zooming.

Figure 6:
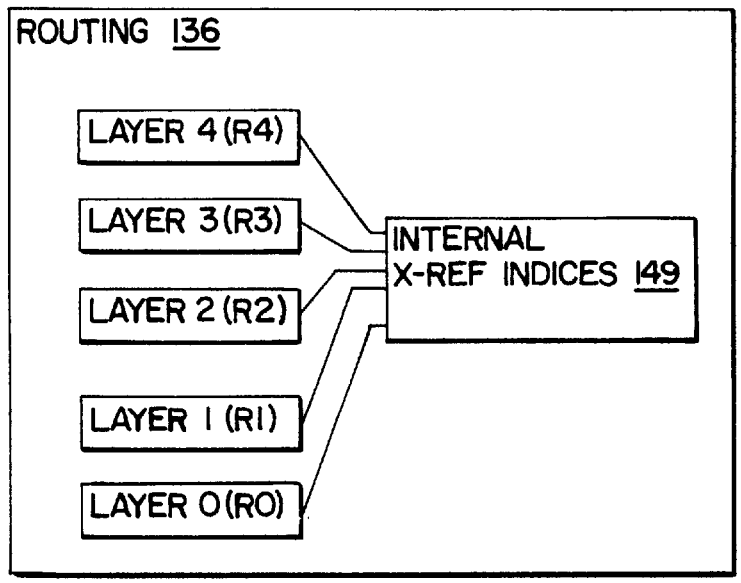
FIG. 6 is a diagram illustrating separate layers of data in the routing data shown in FIG. 5.

Although the organization of some of the data into layers results in some duplication of the data, the increased efficiency provided by layering generally offsets any disadvantages. As with the use of separate types of data mentioned above, the need arises to allow these layers to work together. Indices 149 may be provided for this purpose. In FIG. 6, internal indices are shown. Internal indices 149 are included among the various types of data.

D. Spatial Access to Geogaphic Data

Organizing the data into subsets or types provides separate collections of the data in sizes that are more manageable by each of the navigation functions 29 in the navigation application program. With respect to some subset types, the data can be further organized to facilitate spatial access.

Several of the navigation functions (in FIG. 1) in the navigation application 18 may access or use the geographic data spatially. One way this arises is that a function in the navigation application program 18 requires finding a data entity record in the geographic database 40 given the physical location represented by the data entity in the geographic region. The data entity may be a road segment record that represents a portion of a road in the geographic region and the function may require finding the road segment record based upon the physical location in the geographic region of the portion of the road represented by the road segment record. The data entity may be a POI record that represents a hotel closest to the present position of a vehicle in which the navigation system is installed. Another way spatial access arises is when a function in a navigation application program requires finding several or all of a type of data records located close to a location in the geographic region or within a defined area in the geographic region. For example, a function may require all restaurant POI records encompassed within a rectangle defined by geographical coordinates (x, x+n) latitude and (y, y+m) longitude.

Referring again to FIG. 5, some of the subsets of geographic data are organized spatially and other subsets of data are organized in a manner other-than-spatially. Spatially-organized data are arranged so that the data that represent geographically proximate features are located logically and/or physically proximate in the data set 40 and/or on the medium 32. For some of the navigation application functions, spatial organization of their respective data provides for reading closely related geographic data from the medium more quickly and loading related geographic data into memory where they can be used. This kind of organization minimizes accessing of the storage medium 32 and speeds up operation of these navigation functions.

The subsets of the geographic data 40 that are organized spatially include the route calculation data 136, the cartographic data (map display) 137, and the point-of-interest data 139. Other kinds of data may also be organized spatially. Spatial organization can be applied to the data in different ways. For example, spatial organization can be applied to each record of data or can be applied to groupings of pluralities of data records (e.g., such as parcels of data, as explained below).

Some of the subsets of the data are organized and accessed in ways other than spatially. The non-spatially organized data include the junction data 140, the navigable feature data 141, the cartographic feature data 142, the postal code data 143, and the place data 144.

E. Parcelization of Geographic Data

There are several factors that can affect the operation and performance of a navigation application program when using geographic data. In order to provide a reasonably high level of functionality, a relatively large database may be provided. Storage media, such as CD-ROM discs or PCM-CIA cards, are capable of handling databases of the size and complexity sufficient to provide suitable functionality. However, accessing these types of media can be relatively slow. Because navigation systems may be installed in vehicles, or may be hand-held, the hardware resources of the navigation system may be limited. Navigation systems installed in vehicles or hand-held units may have limited memory resources and relatively slow media access rates. Even when navigation applications are provided on platforms that have greater memory and hardware resources, similar considerations apply, but at a different scale.

Assuming that all the data records for a given entire geographic region cannot be loaded into the memory of the navigation system at the same time, due to limited memory resources of the navigation system in which the navigation application program is being run, it would be desirable to load into memory only those data that are needed to perform a desired function. In order to accomplish this, data in the geographic database 40 are organized into parcels. A parcel of data is established to contain data records that are always obtained together in a single access of the medium. This may relate to the quantity of data that can be accessed in a single disk access, although it may be related to some other factor. For some types of media such as a CD-ROM discs, a parcel may be established to be a 16 Kilobyte quantity of data. (Other sizes of data may be used including 1 K, 2 K, 4 K, 8 K, 32 K, and so on.)

Figure 7:
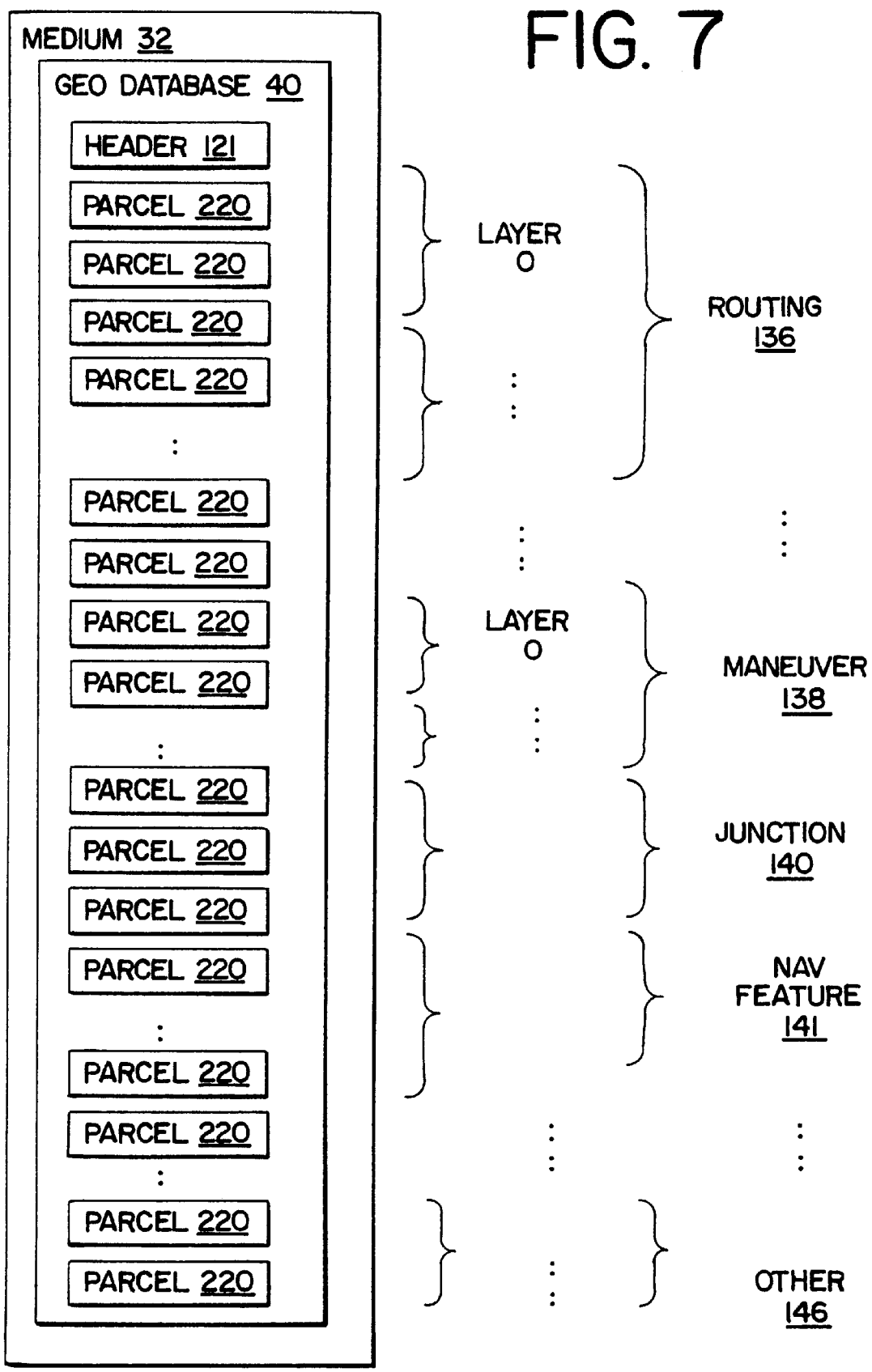
FIG. 7 is a diagram showing the arrangement of parcels of data in the geographic database of FIG. 1.

As shown in FIG. 7, parcels 220 of data are stored to form the database 40 so that the data in each parcel 220 are logically and/or physically grouped together. When a parcel of data is accessed, all of its data records are read from the medium into the memory of the navigation system at the same time. For purposes of forming the data into parcels, the data are first separately organized into the different types (as shown in FIG. 5) based upon the functions that access them, such as routing, map display, and route guidance, and so on.

(1). Parcelization of Spatially Organized Data.

In parcelizing data, it is preferable generally to form parcels of data in a manner that minimizes the number of parcels that have to be accessed and read in order to perform a navigation function. As mentioned above, it is sometimes desirable to store the data representing geographic features based upon the physical proximity of the features. With respect to the spatially organized data, it would be advantageous to provide a means to load data into memory based generally upon the physical geographic locations of the features which the data represent or upon the geographical proximity of the features which the data represent. This can be done by parcelizing the data so that they are organized in the database and/or on the medium based upon the geographic locations of the features which are represented by the data.

Spatially-parcelized data are arranged so that the data that represent geographically proximate features are located logically and/or physically proximate in the database 40 and/or on the medium 32. For some of the navigation application functions, spatial parcelization of their respective data provides for reading closely related geographic data from the medium more quickly and loading related geographic data into memory where they can be used. This kind of organization minimizes accessing of the storage medium 32 and may speed up operation of these navigation functions. The routing data 136 (in FIG. 5) are included among the kinds of data that may be spatially organized.

There are a number of different procedures that can be used for parcelizing geographic data spatially. For example, a simple parcelization method may provide for separating the geographic data into a plurality of parcels wherein the data in each parcel represent features encompassed within a separate one of a plurality of regular sized rectangles which together form a regular, rectangular grid over the geographic region. Another method for spatial parcelization is to separate the data into parcels encompassed within rectangular areas where each of the rectangles is formed by a bisection of rectangles encompassing parts of the region until a parcel size below a maximum threshold is obtained. In addition, parcelization procedures are disclosed in the copending application Ser. No. 08/740,295, filed Oct. 25, 1996, the entire disclosure of which is incorporated by reference herein, and parcelization procedures are also described in the copending patent application Ser. No. 08/935,809, filed Sep. 5, 1997, the entire disclosure of which is incorporated by reference herein. Still another method of parcelization to which the disclosed subject matter can be applied is described in U.S. Pat. No. 4,888,698.

Figure 8:
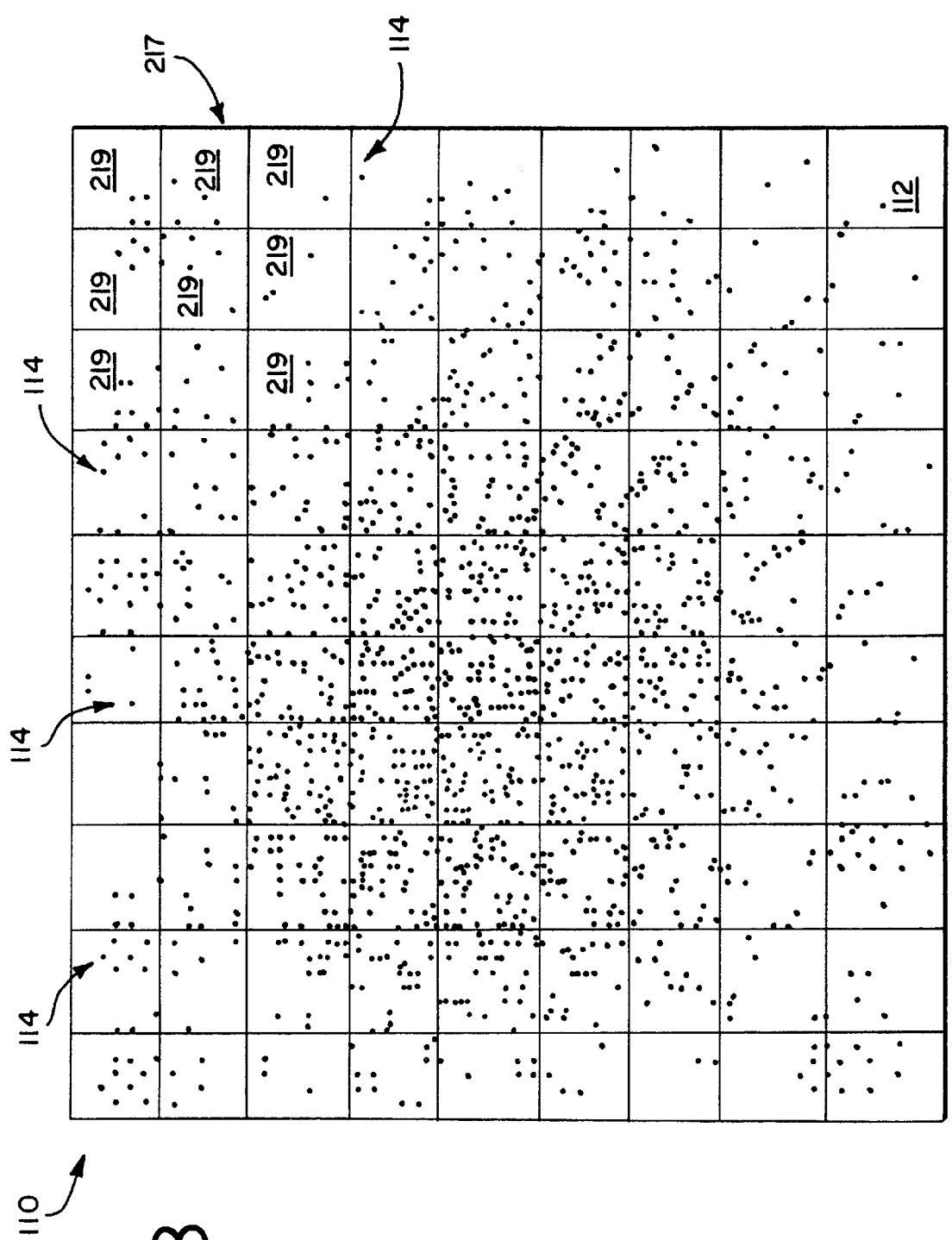
FIG. 8 shows a map of the geographic region of FIG. 2 illustrating application of a parcelization method to spatially organized geographic data.

Parcelization of spatially organized data is illustrated with reference to FIGS. 8 and 9. FIG. 8 shows the map 110 of the geographic region 112, previously illustrated in FIG. 2. The plurality of positions 114 (represented by the dots or points) are shown to be located on the map 110. Each of the positions 114 represents a place or point in the geographic area 112 at which there is located a feature about which information is included in the geographic database 40 of FIG. 1. For example, the positions 114 may correspond to the physical locations of end points of road segments, points along road segments, points-of-interest (such as hotels, civic centers, etc.), and so on, which are represented by the data in the geographic database 40. Each of these locations 114 has a unique physical location (latitude, longitude, and optionally absolute or relative altitude) and each of the locations 114 can be uniquely identified by its two dimensional (or three dimensional) geographic coordinates (i.e., latitude, longitude, and optionally altitude).

In FIG. 8, a grid 217 overlays the geographic region 112 represented by the map 110. The grid 217 divides the geographic region 112 into a plurality of rectangular areas 219. The grid lines of the grid 217 represent the boundaries of rectangular areas 219. These rectangular areas 219 may be all the same size or may have different sizes depending upon the procedure used for parcelization. Likewise, the locations of the boundaries may depend on the parcelization procedure used. In general, when using any of the procedures for spatial parcelization, the data records of a particular type of data which represent features that are encompassed within each rectangular area 219 are grouped together in a separate parcel of data. Referring to FIGS. 7 and 9, the plurality of data records, such as road segment records 322 and node records 323 that comprise the routing subset 136 of the geographic database 40, are separated into groupings (i.e., parcels 220). With respect to the spatially organized data, each parcel 220 of routing data in FIGS. 7 and 9 includes one or more data records 322, 323, which represent the geographic features encompassed within a separate one of the plurality of rectangles 219 shown in FIG. 8.

As shown in FIG. 7, the parcels 220 are then stored to form the database 40 so that the data in each parcel 220 are logically and/or physically grouped together. Since the parcel represents a quantity of data records that are accessed at the same time by the navigation system, when a parcel of data is accessed, all of its data records are read into the memory of the navigation system at the same time. With reference to the map 110 of FIG. 8, this means that all the data records, such as the segment records 322 or node records 323, of a spatially organized type of data that represent geographic features encompassed within each rectangle 219 are accessed together as a group. It can be appreciated that for certain kinds of navigation functions, it is desirable to have in memory at the same time all the data records that represent features that are physically close together in the geographic region.

As the parcels 220 are formed for these types of data, the parcels are ordered. Various types of ordering may be used. In general, it is preferred that the parcels be ordered in a manner that minimizes searches for data. One way to order spatially organized parcels is to use a depth-first ordering from a kd-tree index within each type of data. This provides an ordering similar to Peano-key ordering. Parcels may be stored on disk (i.e., medium 32 in FIG. 1) in this approximate Peano-key order. One or more indices, such as a kd-tree, can be used to access parcels spatially. This index is useful for initial location of an arbitrary position, such as when a program in a navigation system initially locates the map data corresponding to a current vehicle position. As the parcels 220 are ordered, each may also be assigned a unique parcel identifier (e.g., a "parcel ID"). The parcel ID may be used to identify the parcel and/or its location on the medium.

(2). Parcelization of Non-spatially organized Data.

Some kinds of data are not spatially organized. Parcelization may provide advantages for these kinds of data as well. Each parcel of non-spatially organized data does not necessarily correspond to any of the rectangular areas 219 in FIG. 8. For example, the navigation feature data 141 that represents the names of navigable features, such as streets and intersections, may be organized alphabetically instead of spatially. Also, place data 144 are among the kinds of data that are not spatially organized. Place data 144 are organized by administrative hierarchy. Place data 144 includes place data records which are used to represent governmental or administrative areas, (e.g., countries, cities, states, counties, zones, settlements, and so on). Place data 144 are organized in a hierarchical manner that takes into account the administrative levels of the places represented by the data. Once the place data records are organized in this hierarchical manner, they are formed into parcels 220 (in FIG. 7) and stored to form the geographic database. (Since the place data entities are not spatially organized, each parcel of place data does not necessarily correspond to any of the rectangular areas 219 in FIG. 8.)

According to one embodiment, place data are arranged by levels which correspond to the administrative hierarchy. Level 1 place data records (i.e., those corresponding to the "countries" whose geographic features are represented by the geographic database 40) are included first in the place data 144. If more than one country is represented by the geographic database (e.g., Canada and the United States), the level 1 records are ordered alphabetically.

Next, all the level 2 place data records (i.e., those corresponding to the "states" in the U.S. or "provinces" in Canada) whose geographic features are represented by the geographic database 40 are arranged. These place records are ordered first according to which of the countries represented by level 1 records they are a part of, and then once they are sorted by country, they are sorted alphabetically. Thus, if the geographic database includes Canada and the United States, all the place data records that represent provinces of Canada are arranged in alphabetical order first followed by all the place data records that represent states of the United States arranged in alphabetical order. (Note that the geographic database does not necessarily include all the states or all the provinces. Only those that are represented by the geographic database are included.)

Next, all the level 3 place data records (i.e., those corresponding to the "counties" in the U.S. and Canada) whose geographic features are represented by the geographic database 40 are arranged. These place records are ordered first according to which of the states (or provinces) represented by level 2 records they are a part of, and then alphabetically. Thus, if the geographic database includes Illinois and Iowa, all the place data records that represent counties of Illinois are arranged in alphabetical order first, followed by all the place data records that represent counties of Iowa arranged in alphabetical order.

Finally all the level 4 place data records (i.e., those corresponding to the "cities" in the U.S. or Canada) whose geographic features are represented by the geographic database 40 are arranged. These place records are ordered first according to which of the states (or provinces) represented by level 2 records they are a part of, and then alphabetically. Thus, if the geographic database includes Illinois and Iowa, all the place data records that represent cities of Illinois are arranged in alphabetical order first, then followed by all the place data records that represent cities of Iowa arranged in alphabetical order.

Place data may be indexed in at least two ways. First, there is a B-tree index for the hierarchically organized place data described above. The key in this B-tree index is a place data record identification number plus the place name. (In a present embodiment, the place data record identification number consists of a combination of the identification number of the parcel in which the place data record is contained and a record number for the place data record within the parcel.) This B-tree facilitates searching alphabetically for places under a certain parent in the hierarchy (e.g., cities in Illinois that begin with "C"). Second, there is an index (including a B-tree) of place data record identification numbers ordered alphabetically by level in the hierarchy. The index information includes the place data record identification number, a portion of the place name, and a language bitmap (which is described in more detail below). This index facilitates searching alphabetically for places at a certain level (e.g. all cities that start with "C"). Each of these indices are organized as a B-tree of minimal height, with the root of the index kept in memory, and with index page sizes such that a place record can be found with a minimal number of reads of index records (preferably, a single read), followed by a read of a place parcel.

The parcelization of place data described above represents one way that these data records can be organized. Other kinds of organization may be used. For example, other kinds of hierarchical arrangements may be used for the place data. Alternatively, the place data records may be spatially organized like the point of interest data.

F. Representation of Complex Intersections

The various techniques described above enhance the operation of a navigation system by organizing, arranging, and ordering the geographic data in ways that facilitate their use in the navigation system. Another way to enhance the operation of a navigation system is to provide special kinds of representations for certain geographic features. Thus, in addition to having data records that accurately represent the actual physical geographic features in a region, according to a present embodiment, the geographic database may include substitute records that are used for certain navigation functions. These substitute records may provide abbreviated or shortcut representations of certain complex features. These substitute records may be used by certain navigation functions in the navigation application instead of the records that represent the actual features. This allows the navigation function to avoid the additional computations associated with handling of the data records that represent the actual complex features. In a present embodiment, substitute records are included in the route calculation subset 136 (of FIG. 5) of the geographic data and are used in this subset to represent certain complex intersections. As mentioned above, the route calculation subset 137 of geographic data includes entities that represent nodes and road segments. The node entities store positional information (i.e., latitude and longitude) about the end points of a road segment. (There may also be node entities that relate to positional information other than the end points of road segments.) The positional information related to each node is stored in terms of a longitude, latitude, and possibly an altitude. This node entity may also contain attributes which provide additional information about the node.

As mentioned above, the parcelization method used for the route calculation subset of the data provides for maximizing the amount of relevant route calculation information that can be kept in memory at once thereby minimizing time-consuming memory operations during route calculations. According to this aspect of the present embodiment, the route calculation function 41 (in FIG. 1) may be sped up by including collapsed node data entities (referred to as "supernode data entities") in the route calculation data set 137. Each of these collapsed nodes or supernodes represents a plurality of closely-spaced or related regular nodes and segments. Wherever a supernode is used to represent a plurality of regular nodes, each road segment that is connected to any of the nodes represented by the supernode from outside the supernode is associated with the supernode instead of with the regular nodes by the supernode. Then, when the route calculation function 41 accesses any of these road segment records to calculate a route, the supernode record is identified as corresponding to the endpoint of the segment instead of one of the plurality of regular node records represented by the supernode. Including the supernode records has the effect of replacing certain complex intersections in the route calculation subset 137 of the geographic database 40 with simplified intersections. Replacing certain complex intersections with simplified intersection representations reduces the time and data required for the route calculation function 41 to calculate a route through these intersections.

Figure 9:
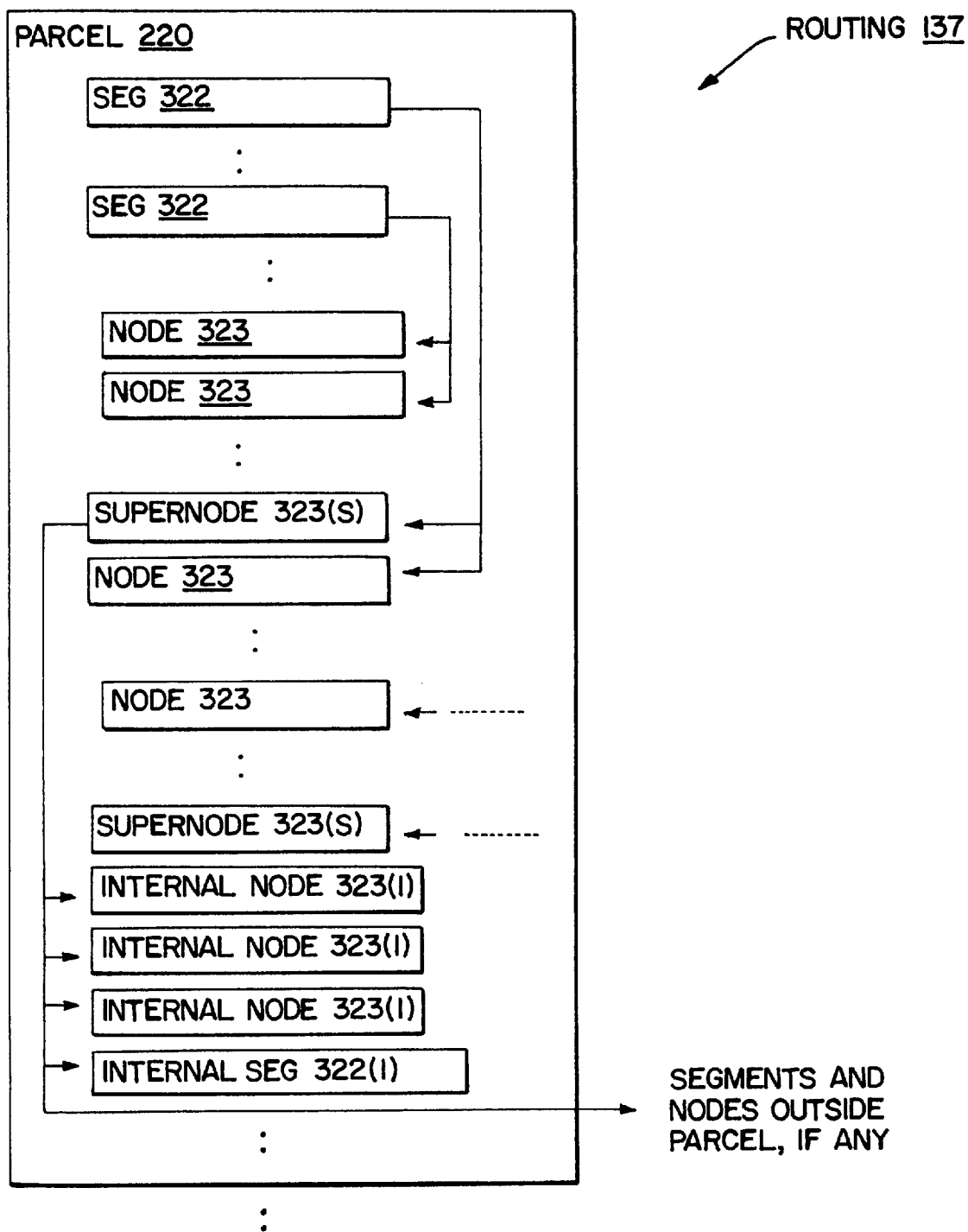
FIG. 9 is a diagram showing the arrangement of segment and node data records within a single parcel of routing data in the geographic database of FIG. 7.
Figure 10A:
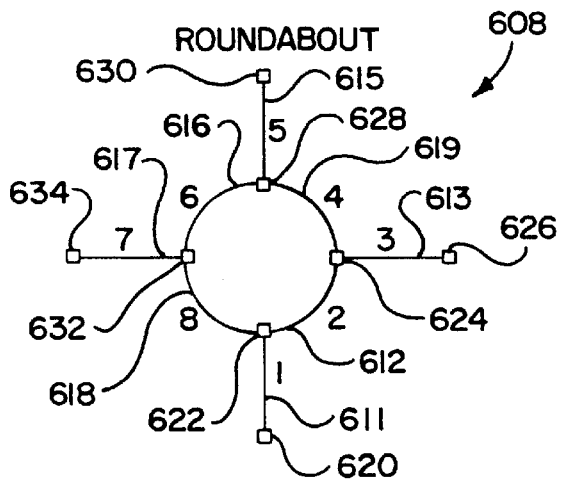
FIGS. 10A–10F are illustrations of complex intersections and corresponding substitute representations of these complex intersections according to one embodiment of the database of FIGS. 1 and 9.
Figure 10B:
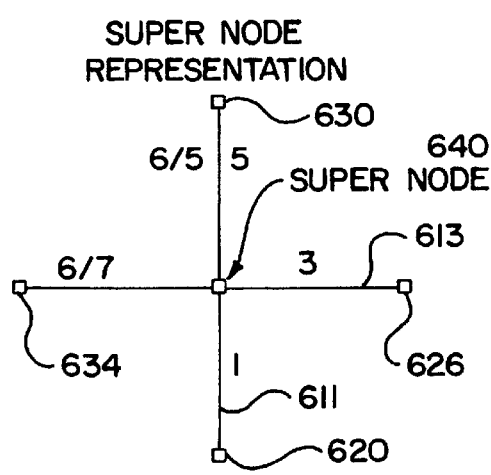
Figure 10C:
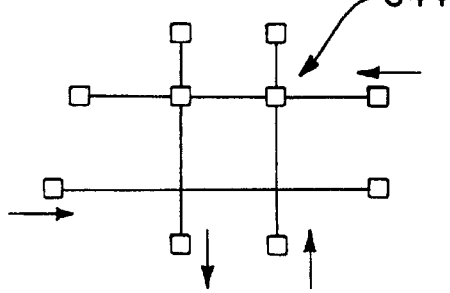
Figure 10D:
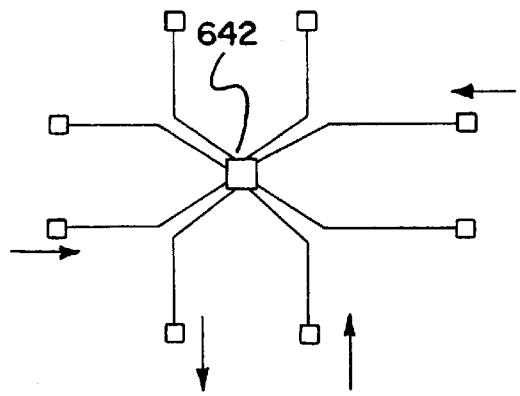

Some examples of such complex intersections that are represented by supernodes are illustrated at FIGS. 10A, 10C, and 10D. For example, referring to FIG. 10A, there is a map illustrating a roundabout 608. In the route calculation subset 41, the roundabout 608 is formed of segments 612, 614,616, and 618, and nodes 622, 624, 628, and 632. According to the present embodiment, the nodes and segments forming the roundabout 608 are collapsed into a single supernode represented by a supernode record in the routing data subset 137. FIG. 10B shows a map graphically illustrating the supernode 640 that represents the complex intersection of FIG. 10A. A parcel 220 of routing data 137 that includes both regular nodes records 323 and supernode records 323(S) is shown in FIG. 9. A supernode data entity 323(S) (in FIG. 9) is generated automatically during compiling of the route calculation subset 137. The segment records 322 in the routing data subset 137 that represent the segments 611, 613, 615, and 617 (illustrated in FIG. 10A) indicate that they connect to the supernode 640 instead of to node records that represent the actual nodes 622, 624, 628, and 632, respectively. Although the geometry of the road segments 611, 613, 615, and 617 appears different in the supernode representation of FIG. 10B, all the attributes of the segment data records 322 in the database, including the segment length, remain the same as they would for the full representation of the intersection.

As mentioned above, the purpose of including the substitute supernode records in the routing data subset 137 is to provide a simplified representation of the road network which can help speed up route calculation function 41. For example, without the supernode representation, if the route calculation function 41 in the navigation application program 18 is attempting to calculate a route through the roundabout 608 of FIG. 10A from node 626 to 630, it would have to process traveling from node 626 to node 624, node 624 to node 628, and node 628 to node 630. With the supernode representation of FIG. 10B, the route calculation program 41 only has to process traversal from node 626 to node 640 and node 640 to node 630.

In a preferred embodiment, even if supernode records are used in a given level of the route calculation subset 137, the data subset at that level also includes the plurality of regular node records (i.e., internal nodes 323(I) in FIG. 9) that are represented by the supernode record. This allows any information associated with the regular nodes to still be accessible to the navigation application program, if needed. For example, in order to display a map of a calculated route, it may be necessary to obtain the regular node records represented by the supernode record so that all the road segments can be shown. This can be determined because each of the supernode records provides a reference back to its constituent.

Because an exact location is unnecessary for a supernode, a supernode is given a geographic location approximately at the center of the group of nodes it represents. A supernode and the nodes it represents are treated as a unit when parcelizing, so that regular nodes represented by a supernode are placed together in the same parcel.

When the data are organized in layers as in the route calculation subset 136 of data or the cartographic subset 137 of data, supernodes can be defined in any layer.

A function call in the route calculation subprogram 41 of the navigation application can be used to translate a supernode back into the regular nodes and segments that it represents. Another function call can be used to retrieve an ordered list of the segments inside the supernode to be traversed in order to get from one segment connected to the supernode to another.

A function call can be used to obtain the relative travel cost (or "impedance") of the supernode. The relative cost of a supernode (or of a regular node) is an indication of how much time is required to travel across the node. The relative travel cost of a supernode may be included as an attribute of the supernode entity, or preferably the travel cost of a supernode may be based on the length and/or speed of travel of the segments inside the supernode to be traversed to get from one segment connected to the supernode to another of the segments. In the example of FIG. 10A and 10B, the relative travel cost to get firm the segment 611 to the segment 615 is based on the lengths of the segments 612 and 619 as well as the two right turns required to travel from segment 611 to segment 615. The function call may be included in the route calculation subprogram 41 of the navigation application to obtain this information.

Figure 10E:
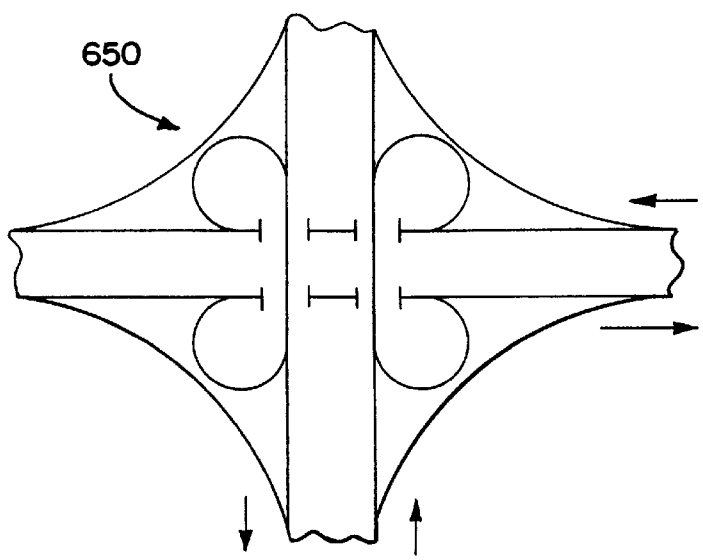
Figure 10F:
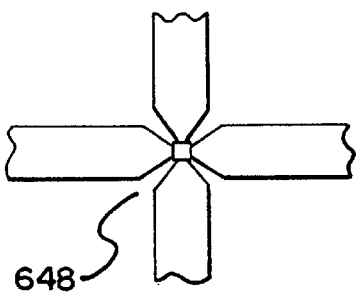

Supernodes may be used to represent any intersection and are particularly useful when representing complex intersections that include more than two roads. For example, a supernode representation 642 may be used for divided highways 644 (as shown in FIGS. 10C and 10D) and a supernode representation 648 may be used for cloverleaves 650 (as shown in FIG. 10E and 10F).

In a present embodiment, the determination of when to include a supernode as a representation of several regular nodes is done at compile time based upon a predetermined set of rules. For example, a candidate supernode is established and examined to determine whether it meets the predetermined set of conditions. For example, for forming supernodes for divided highways, the routing data are examined to find all occurrences wherein two multiply-digitized roads intersect. (Multiply-digitized roads are roads in which separate segments are used to represent traffic in each direction.) The intersections of these multiply-digitized roads are examined to determine whether there are exactly four internal nodes at the intersection, whether there are exactly four segments internal of the intersection, and whether each of the internal segments connects to two, and only two, other internal segments by means of internal nodes. If all these conditions are met, a supernode entity is formed and stored in the layer of routing data.

Similarly, supernodes may be automatically generated for roundabouts. The rules for forming a roundabout include no limitation on how many internal nodes and segments are included within the roundabout. As with the multiply-digitized roads, a candidate supernode is formed of a grouping of nodes and segments. The nodes and segments used to form the candidate supernode include those having display characteristic indicating that they are part of a roundabout.

Figure 11:
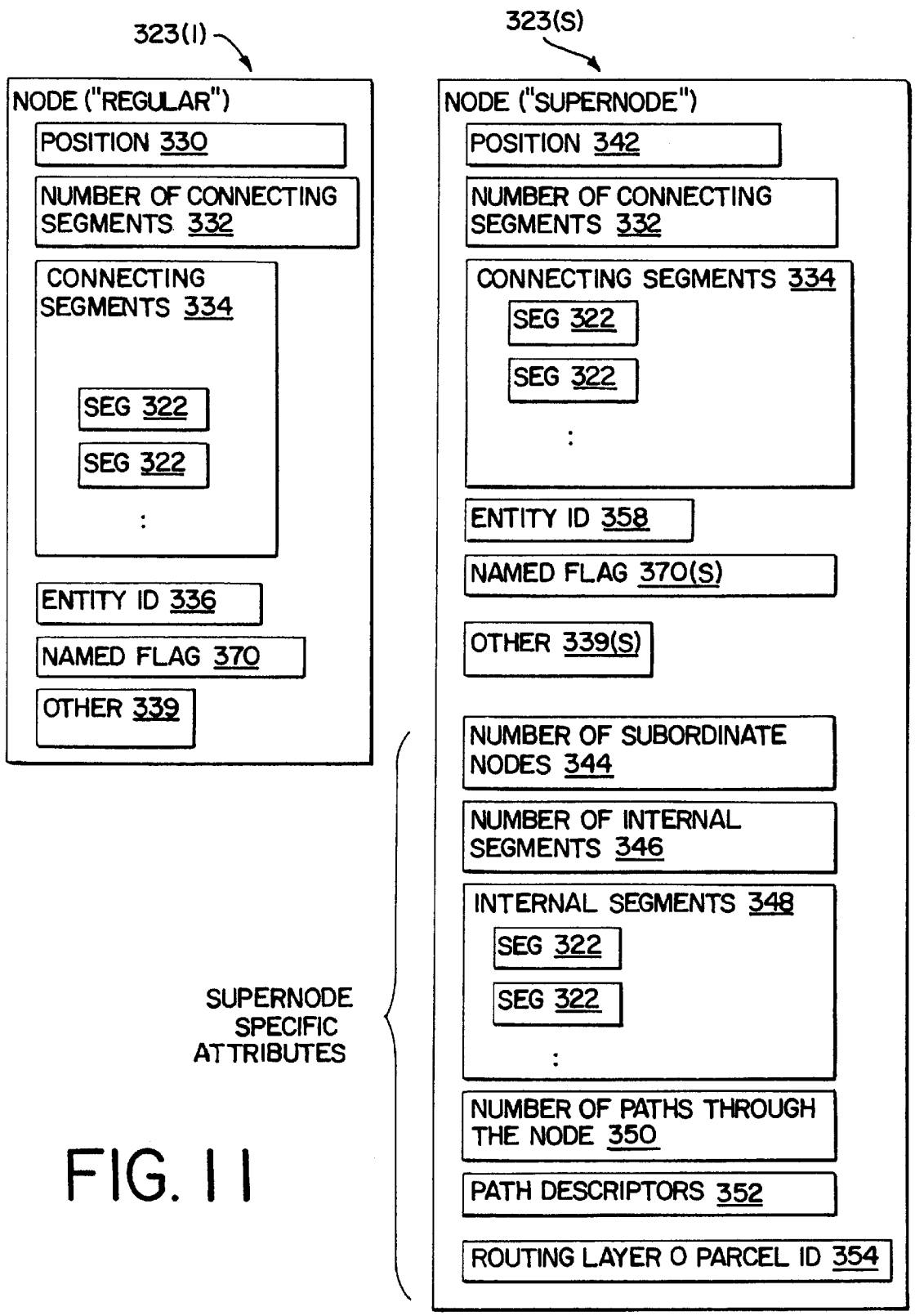
FIG. 11 is a diagram illustrating the components of two node records included in the parcels of routing data shown in FIG. 9.

FIG. 11 illustrates the components of two node data entities 323 that are included in the routing data subset 137 of the geographic database. One of the node data entities 323(1) represents a regular (i.e., "non-super") node and the other node data entity 323(S) represents a supernode. These entities 323 are included in parcels 220 of the routing data 137. The "non-super" node record 323(1) includes position data 330 that indicates the geographic coordinates (i.e., latitude, longitude. and optionally altitude) of the represented node. The node record 323(1) also includes data 332 that indicates the number of segments that connect to the node (i.e., the "arms" of the node). The node record 323(1) includes data 334 that identifies the segments 322 (by segment record ID) that connect to the node. The node entity 323(1) includes data 336 indicating a unique ID for the node. The node entity 323(1) optionally includes a data flag 370 that indicates whether the node is named and therefore represented by a junction record, as explained below. The node data entity 323(1) may also include other data 339.

The supernode record 323(S) includes some or all of the same information that is included in a regular (non-super-) node 323. The supernode record 323(S) includes position data 342 that indicates the generated geographic coordinates (i.e., latitude, longitude, and optionally altitude) of the supernode. (As mentioned above, this position is generated to correspond to a point approximately equidistant from the regular nodes represented by the supernode.) The supernode record 323(S) includes data 332 that indicates the number of segments that connect to the node. The supernode record 323(S) includes data 334 that identifies the segments 322 (by segment record ID) that connect to the node (i.e., the "arins" of the supernode). The supernode record 323(S) includes data 358 indicating a unique ID for the node. The supernode entity 323(S) optionally includes a data flag 370 that indicates whether the supernode is represented by ajunction record, as explained below.

In addition to the data attributes that are similar to those in a regular node, the supernode record includes additional data attributes. The supernode entity 323(S) also includes data 344 that indicates the number of subordinate nodes that it represents. The supernode entity 323(S) also includes data 346 that indicates the number of internal segments that are represented by the supernode. The supernode record 323(S) includes data 348 that identifies the internal segments 322(1) (by segment record ID) that are represented by the supernode. As illustrated in FIG. 9, these internal segments 322(I) are located in the routing data subset 137. These segments may be in the same parcel 220 as the supernode record 323(S) that refers to them, or alternatively, some of these segments may be located in another (e.g., a neighboring) parcel. The supernode record can reference segments in other parcels.

Referring again to FIG. 11, the supernode record 323(S) includes data 350 indicating the number of paths through the supernode. The paths through the supernode are identifications of each of the other arms are accessible from each arm leading into the supernode. The supernode entity 323(S) includes data 352 that represents the path descriptors that describe these paths through the supernode. By identifying, describing and storing these paths in the supernode record, a route calculation program 41 can avoid the possibly time-consuming computations associated with traversing a complex intersection.

The supernode record 323(S) also includes data 354 that identifies the layer 0 routing parcel ID corresponding to the position of the supernode.

III. REPRESENTATION OF NAMED INTERSECTIONS

In order to represent intersections that have names, the geographic database 40 includes junction data records. According to one embodiment, the geographic database 40 includes one or more junction data records for each intersection in the geographic region that has a name associated with it. A geographic region may include hundreds, thousands or more of such named intersections. Accordingly, a geographic database 40 that represents a geographic region includes a corresponding plurality of junction data records. The junction data records are included in the junction data subset 140 of the geographic database 40, shown in FIG. 5. As mentioned above in connection with FIG. 5. the junction data subset 140 forms a separate subset of data within the geographic database 40.

The naming of intersections may be formal or informal. Some intersections are formally named and others may have names by which they are known informally. According to one embodiment, the geographic database provides for identifying intersections by name regardless of whether an intersection is formally named or whether the intersection name developed informally by common usage. According to one embodiment, all named intersections are represented by junction data records in the geographic database. According to another embodiment, only complex named intersections are represented by junction data records in the geographic database.

1. Junction Data.

Figure 12:
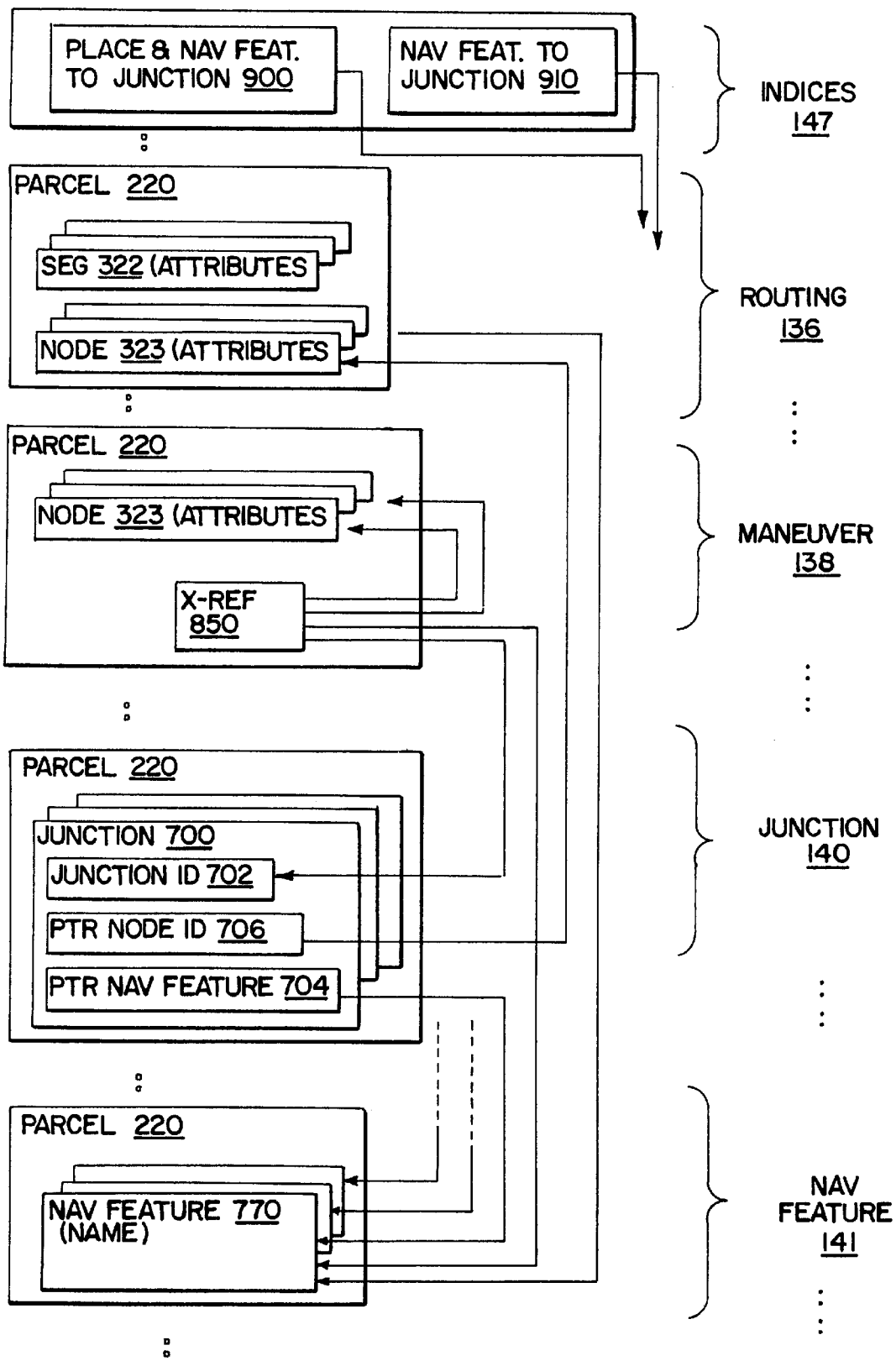
FIG. 12 is a diagram illustrating the relationships between the different kinds of data records in parcels containing different types of geographic data in the geographic database shown in FIG. 7.
Figure 13:
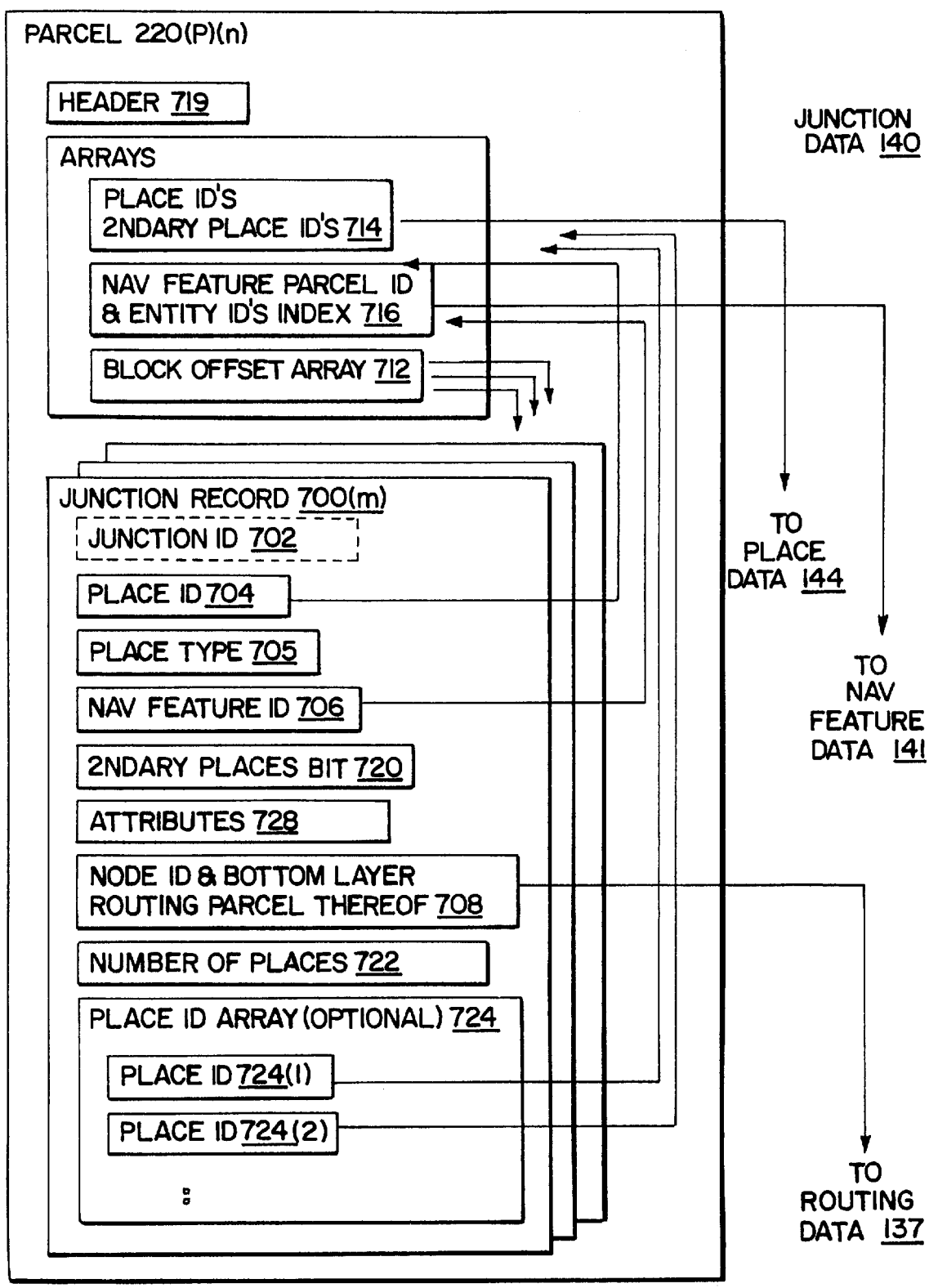
FIG. 13 is a diagram illustrating the components of one the parcels of junction data as shown in FIG. 7 including the components of a junction record.

FIGS. 12 and 13 show parcelized junction data 140. FIG. 13 shows a parcel 220(P)(n) containing a plurality of junction data records 700. (It is understood that the plurality of junction data records 700 that comprise the entire junction data subset 140 in FIG. 5 may be contained in plurality of parcels, each with a structure similar to the parcel 220(P)(n) depicted in FIG. 13.) The components of a single junction data record 700(m) are shown in FIG. 13. Each junction data record 700 associates an intersection (represented by a node data entity) with a name (represented by navigation feature entity). To perform this function, each junction data record 700 includes one or more data components, as shown in FIG. 13. (In alternative embodiments, the junction data record 700 may include more or fewer than the data components depicted in FIG. 13.)

Each junction data record 700 is associated with a junction ID 702. The junction ID data component 702 is a unique number assigned to the junction record 700 in the geographic database 40. The junction ID 702 may be used by other data records in the geographic database 40 to refer to a specific junction data record. The junction ID 702 may not actually be located with the data contents of the junction data record to which it is assigned. Instead, the junction data record 702 may be accessed through a block offset array 712. Each parcel of junction data contains a block offset array 712. The block offset array 712 associates ajunction record ID 702 with a physical offset into the block of junction data records within the parcel where the data contents of the junction data record associated with the junction record ID 702 are located, The block offset array thereby enables finding the data contents of a junction data record given the junction record ID 702 of the record.

A second data component 704 of the junction record 700(m) references a place. As mentioned above, the geographic database 40 includes place data 144 to represent cities, counties, states, and countries in a geographic region. (In countries other than the United States, these place data represent other corresponding levels of the government hierarchy.) The place referenced by the second data component 704 of the junction data entity 700(m) is the lowest level place (i.e., the city) in which the named intersection represented by the junction record is located. Instead of referring to the place directly by the place ID of the place, each junction data record 700 includes a reference to an entry in a place array 714 within the parcel of junction data in which the junction data record is located. The place array 714 in turn includes a reference to the place ID. Use of the place array 714 reduces the data storage requirements within the parcel.

Another data component within the junction data record 700(m) is a place type 705. The place type data component 705 indicates whether the place is an administrative type place or a postal zone type place.

The junction data record 700(m) also includes a data component 706 that references a navigation feature record 770 in the navigation feature subset 141 of the geographic database. The navigation feature record 770 referenced by the junction data record 700(m) represents the name of the named intersection represented by the junction data record 700(m). Instead of referring to the navigation feature record directly by the navigation feature ID that represents the name, each junction data record 700 includes a reference to an entry in a navigation feature array 716 located within the parcel of junction data in which the referencing junction data record is located. The navigation feature array 716 in turn includes a reference to the navigation feature ID. Use of the navigation feature array 716 reduces the data storage requirements within the junction parcel.

Another data component 708 of the junction record 700 (m) references a node record 323 in the route calculation subset 137 of the geographic database 40. The data component 708 references the node record 323 by node ID. The node record 323 referenced by the junction data record 700 represents the node corresponding to the named intersection represented by the junction data record 700(m). In addition, the data component 708 includes a reference to the bottom layer routing parcel that is associated with the referenced node 323.

A junction may be located in more than one place. For example, a named intersection may be on the border between two or more cities, states, counties or countries. Also, if the junction represents a complex intersection represented by a supernode, some of the segments or nodes that make up the supernode may be in one city and other segments or nodes that make up the supernode may be in another city. When the features that are represented by a junction are in more than one place, separate junction records representing the named intersection are included in the junction data set for each place in which the junction is located. As mentioned above, junction data records are organized first by place ID. Since place ID's are assigned alphabetically, the multiple junction records that represent the same named intersection may be located relatively far apart in the junction data set. For example, a named intersection on the border of the city of "Chicago" and "Park Ridge" would be represented by two junction data records, one grouped with other junction records associated with the place ID for "Chicago" and the other grouped with the other junction records associated with the place ID for "Park Ridge."

When more than one junction data record is associated with the same named intersection, each of the junction data records representing the named intersection includes data for identifying the other places in which the named intersection is located. The junction data record 700 includes data components for this purpose. The junction data record 700 includes a data component 720 that indicates whether the junction record is associated with more than one place. This data component 720 may be a bit flag. If the bit flag 720 is set, it indicates that there is more than one place record is associated with the junction record. If the bit flag 720 is set, the junction data record 700(m) includes a data component 722 that indicates the number of places associated with the junction data record. The junction data record 700(m) then includes a place ID array 724. The place ID array 724 includes a number of entries corresponding to the number included in the data component 722. Each of the entries 724(1), 724(2) . . . in the place ID array 724 references an entry in the place ID array 714 within the parcel.

The junction data record 700 may include additional data components, such as junction attributes 728 which describe other features of the named intersection represented by the junction record. The junction data record may include data components in addition to these.

Each parcel 220(P)(n) of junction data may include information in addition to the information described above. For example each parcel of junction data may include header information 719 which provides for appropriate handling and identification of the data in the parcel.

2. Organization of Junction Data.

Within the separate subset 140 containing junction data, the junction data records are organized by the place ID. As mentioned above, in a present embodiment of the geographic database, place data records are used to represent the political or governmental bodies in a geographic region. The order in which places are organized is described above in connection with the place data 144. A junction data record is included for the lowest level place in which the named intersection represented by the junction data record is located. For example, in the United States, the lowest level place is the city. Thus, even though a named intersection may be located in four places (e.g., the country place of "United States", the state place of "Illinois", the county place of "Cook" and the city place of "Chicago", only one junction data record representing this named intersection is included in the junction data subset 140. (If the named intersection is not in a city place, a higher level place ID may be used.)

Among all the junction data records having the same place ID, the junction data records are further ordered by navigation feature ID. Navigation feature data records (i.e., 770, described below) are ordered alphabetically by name and are assigned navigation feature ID's corresponding to this alphabetical ordering. Thus, junction data records that are located in the same place (and therefore have the same place ID) are then ordered by navigation feature ID (i.e., alphabetically by name). For example, junction data records representing the named intersections "Logan Square" and "Ryan's Circle" located in the city place having the name of "Chicago" would be grouped together and assigned junction ID's among the junction data 140 prior to junction data records representing the named intersections "Aberdeen Interchange" and "Chadwick's Circle" located in the city place having the name of "Cicero."

Like the other kinds of data, the junction data records 700 are organized into a plurality of parcels 220. Specifically, all the junction data records 700 within the separate subset 140 are organized into a plurality of parcels 220 each of which includes a plurality of junction data records organized by place. The junction data records are parcelized separately from the rest of the geographic data. The parcels of junction data records are included among the plurality of parcels 220 shown in FIG. 7, Each of the plurality of parcels that contains junction data entities is stored separately in the geographic database 40 from the parcels that contain other kinds of data entities.

3. Reference Navigable Feature Data.

The navigation feature records 770 referenced by the data components 706 of each the junction data records 700 are included in the navigation feature subset 141 of the geographic database, shown in FIG. 5. The navigation feature data subset 141 of the geographic database 40 contains the names of navigable features, such as the names of roads and intersections. As mentioned above in connection with FIG. 5, the navigation feature data 141 may form a separate subset of data within the geographic database 40. As illustrated in FIG. 12, in a present embodiment, the navigation feature data are separately parcelized from the other types of data in the geographic database.

Figure 14:
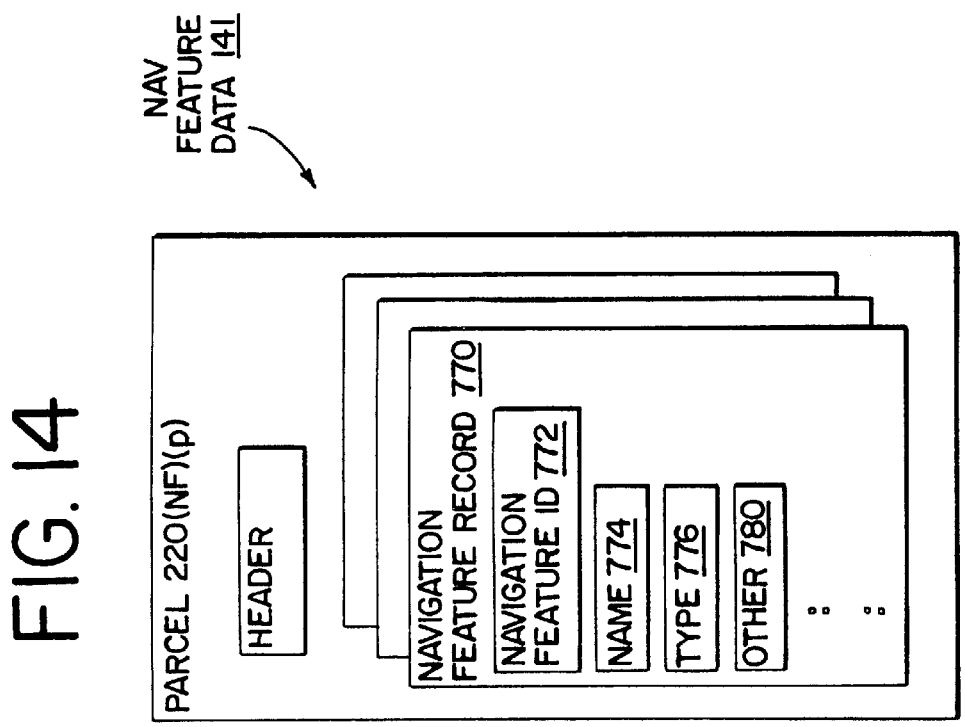
FIG. 14 is a diagram illustrating the components of one of the parcels of navigation feature data as shown in FIG. 7 including the components of a navigation feature record.

FIG. 14 shows a parcel 220(NF)(p) containing a plurality of navigation feature data records 770. (It is understood that the plurality of navigation feature data records 770 that comprise the entire navigation feature data subset 141 in FIG. 5 may be contained in a plurality of parcels 220, each with a structure similar to the parcel 220(NF)(p) depicted in FIG. 14.) Some of the components of a single navigation feature data record 770 are shown in FIG. 14.

A first data component of the navigation feature record 770 is a navigation feature ID 772. The navigation feature ID 772 is a unique number associated with the navigation feature record 770 in the geographic database 40. The navigation feature record 770 also includes a data component 774 that indicates a name for the feature represented by the navigation feature record 770. In the case of a navigation feature record 770 referenced by a junction data record 700, this data component 774 includes the name of the named intersection. For example, if a named intersection is known as "Logan Square", the data component 774 of the navigation feature record 770 referenced by the junction data record 700 that represents this named intersection includes the text "Logan Square." Another data component 776 of the navigation feature record 770 indicates the type of navigable feature represented by the navigation feature record 770. If the navigation feature record 770 includes the name of a named intersection and is referenced by ajunction data record 700, this data component 776 indicates that the navigation feature record 770 represents a name for an "intersection." Navigation feature records 770 are also used to represent the names of other kinds of named navigable features, such as roads, ferries, and so on. Data records that represent these other kinds of navigable features (such as segment data records 322 in FIGS. 9 and 12) may also refer to navigation feature records in order to reference the name of the represented navigable feature. If the navigation feature record is referenced by a road segment record, the data type 776 of the navigation feature record 770 indicates "road segment." Each navigation feature record 770 may also include other data components 780.

Within the subset of navigation feature data 141, the navigation feature records 770 are organized by navigation feature ID. The navigation feature ID's are assigned alphabetically by the represented name. The navigation feature records are organized into a plurality of parcels (such as the parcels 220 shown in FIG. 7) each of which contains a plurality of navigation feature records 770.

4. Referenced Supernode Data.

The node record 323 referenced by the data component 708 of the junction data record 700 is included in the routing subset 137 of the geographic database, shown in FIG. 5. In a present embodiment, the node record 323 referenced by the data component 708 of the junction data record 700 is a supernode data record 323(S). A reason for this is that many named intersections are also complex intersections. Conversely, many complex intersections also have names. As mentioned above, in a present embodiment of the geographic database, complex intersections are represented by substitute data records (i.e., "supernode" data records) in the routing data subset 136 in order to enhance operation of a navigation system during performance of the rioute calculation function 41. Thus, in one present embodiment, only complex intersections that have names are included in the database. In this present embodiment, these complex named intersections are represented by supernode data records 323(S).

According to a present embodiment, each supernode data record 323(S) includes one or more data components that support identification and use of a name for the intersection represented by the supernode data record. Referring again to FIGS. 11 and 12, a supernode data record 323(S) may include a data component 370 that indicates whether the represented complex intersection has a name associated with it and therefore is also represented by junction data record 700. This data component 370 may be a bit flag (i.e., a one bit field). If the intersection represented by the supernode record has a name associated with it and a corresponding junction data record 700, this bit flag 370 is set. Otherwise, if the intersection represented by the supernode record does not have a name (and therefore has no corresponding junction data record 700 associated with it), the bit flag 370 in the supernode data record 323(S) is not set. If the bit flag 370 is set, the supernode data record includes data 368 that refers to a navigation feature data record 770 in the navigation feature data subset 141.

5. Indices.

In order to provide for the junction data entities 700 to work with other types of data, several index files are provided. These may include both external index files 147 and internal index files 149.

Referring to FIG. 12, a first index 900 provides for the identification of a junction record (i.e., the parcel of junction data in which the junction record is located by parcel ID and the junction record within the parcel by junction entity ID) given a place ID plus a navigation feature ID. This index 900 may be used by the navigation application 18 to allow an end-user to query for named intersections given the lowest level place (e.g., the city, etc.) in which it is located.

A second index 910 provides for the identification of a junction record (i.e., the parcel of junction data in which the junction records is located by parcel ID and the junction record within the parcel by junction entity ID) given a navigation feature ID. This second index 910 may be used by the navigation application 18 to allow an enduser user to query for named intersections by name if the place (i.e., the city, state, etc.) is not specified. This index 910 is useful in case the end-user does not know the place (i.e., the city) in which a named intersection is located.

These indices 900 and 910 are external indices maintained among the indices 147 of FIG. 5. In a present embodiment, these indices are B-trees of minimal height. In one embodiment, the root of each index may be kept in memory. The page sizes of each index are such that any junction record can be found with a single read of an index record followed by a read of a parcel containing the referenced junction data record.

In addition to the above external indices 900 and 910, a present embodiment of the geographic database 40 also includes one or more spatial indices for junctions. These one or more spatial indices for junctions are included in the maneuver data subset 138.

Figure 15:
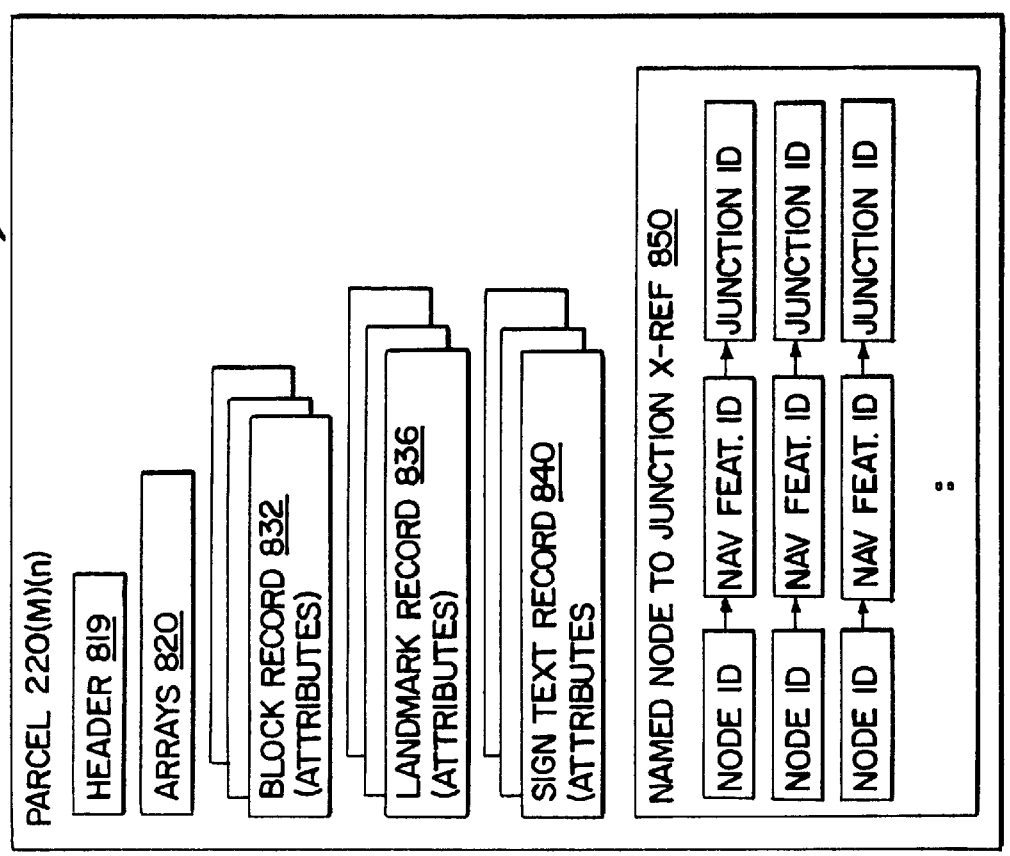
FIG. 15 is a diagram illustrating the components of one of tile parcels of maneuver data as shown in FIG. 7 including a spatial index for junctions.

Referring to FIGS. 13 and 15 each maneuver data parcel 220(M)(n) includes a spatial index for junctions 850. The maneuver data subset 138 of the geographic database 40 may include a plurality of maneuver parcels and accordingly, the geographic database 40 may include a plurality of spatial indices 850 similar to the Is index shown in FIG. 15 in each of the maneuver data parcels.

The maneuver subset of data 138 is used in combination with the route calculation data 136 to provide meaningful route guidance instructions to the end-user. The route calculation data 137 contains only part of what is needed for direction generation for the end-user. The route calculation subset of data 136 is used to calculate a route given a starting location and a destination. The maneuver subset of data 138 is used after the route has been calculated by using the route calculation data 136. The data included in the maneuver subset 138 are used for direction generation during the driving of the calculated route to provide meaningful guidance to the end-user. The maneuver subset of data 138 contains block data (i.e., records that represent street address ranges), landmark data, and sign post data. The maneuver subset 138 also includes related cross reference indices and arrays. These kinds of data are used when the end-user is being provided with maneuvering instructions along the route as the route is being driven.

The maneuver data 138 are spatially parcelized. Thus, all the maneuver data records (i.e., records for blocks, landmarks, and sign posts) contained in each parcel of maneuver data are encompassed within a separate geographic (rectangular) area which is distinct from each of the geographic areas that encompass the geographic features that are represented by the maneuver data included in each of the other parcels of maneuver data. With reference to FIG. 8 for example, the maneuver data in each parcel of maneuver data may represent the features contained in separate one of the rectangular areas 219 in FIG. 8. (It is noted that the locations of the boundaries of the rectangular areas that define the maneuver parcels depend upon the method used for parcelizing the data.)

FIG. 15 shows a parcel 220(M)(n) of maneuver data 138. The parcel 220(M)(n) of maneuver data includes header information 819 and arrays 820, which serve functions similar to those described above in connection with the junction data parcels. The maneuver parcels also contain block records 832, landmark records 836, and sign text records 840. These records may be spatially organized, e.g., in Peano key order. In addition, each maneuver parcel 220(M) also contains a named-node-to-junction index 850. This index 850 relates a named node (by node ID) to the name for the named node (by navigation feature record ID) and to the junction record associated with the named node (by junction record ID). This index 850 includes an entry for each named node encompassed within the geographic area 219 corresponding to the parcel. This index 850 is developed by identifying each of the nodes in the routing data subset 136 that has a junction record associated with it (i.e., that has the named intersection flag 370 set). The entries in this index 850 are ordered by node ID. Since node ID's are assigned in a spatial order (e.g., in Peano key order), the entries in the index 850 are spatially organized within the maneuver parcel. The maneuver parcels are also spatially organized. Thus, using a spatial index into the maneuver parcels (which is contained among the external indices 147 in FIG. 5), and then using the spatial index 850 located within a single maneuver parcel, the junction record and name for any named intersection can be found spatially. For example, using this index 850, if the coordinates of a bounding rectangle are specified, all the junctions that are encompassed within the bounding rectangle can be determined.

IV. METHODS FOR USING NAMED JUNCTIONS

As mentioned above, using an embodiment of the geographic database that includes junction data records, a navigation application program 18 in a navigation system can support the use of named intersections for various navigation functions.

EXAMPLE A

Figure 20:
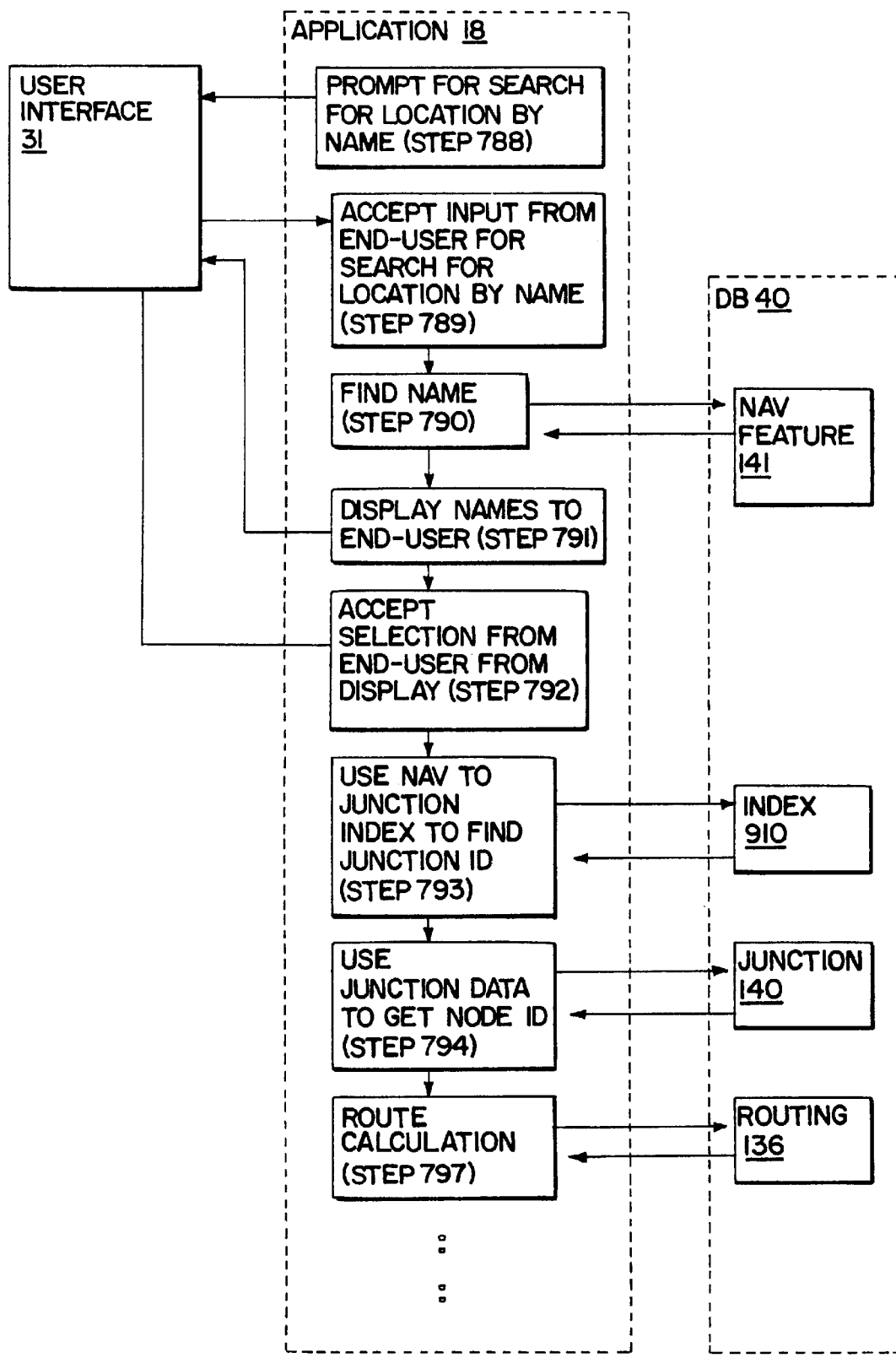
FIG. 20 is a flow chart illustrating a method for using, a geographic database that supports named junctions for selecting a destination.

One way that the navigation application program can support this feature is by allowing an end-user to specify an intersection by name as a starting point or a destination of a route prior to route calculation. A first embodiment of a method for using a geographic database that supports the use of named intersections is described in connection with FIG. 20. The navigation system 10 may provide various ways by which an end-user can enter a desired destination. For example, the navigation system may allow the end-user to enter a desired destination by street address. Alternatively, the navigation system may allow the end-user to search for a destination by name or type and present the end-user with a list of search results from which the end-user then selects the desired destination. The navigation application 18 may use a menu on the display 27 of the user interface 31 for these purposes.

Using an embodiment of the present application, the navigation system may allow the end user to search for a destination by name if the desired destination is a named intersection. According to one alternative method, the navigation system may first allow the end-user to specify whether the destination name to be searched is a navigable feature, a point of interest or a place. Assuming the end-user selects a search of navigable features, the navigation system then prompts the end-user to enter Is the name to be searched (step 788 in FIG. 20). The navigation system accepts the input from the end-user (step 789). Using the navigation feature subset of data 141, the navigation application 18 searches for the navigable feature with the name entered by the end-user (step 790). Assuming a match is found, the navigation system then presents its search results to the end-user via the user-interface (step 791). The search results may include only exact matches or may include similar matches as well. Because the navigation feature subset 141 represents the names of various types of navigable features, the results presented to the end-user may include names for segments as well as names for intersections. The end-user selects one of the displayed names and the navigation application accepts this input (step 792). The search results may include an indication as to which kind of navigable feature each of the displayed names represents. If the name selected by the end-user is a named intersection, the type 776 of navigation feature will indicate that it is a name for an intersection. Then, using the navigation feature ID of the selected name in the navigation-feature-to-junction index 910, the junction ID of the named intersection can be obtained (step 793). Using the junction ID, the junction record can be obtained from the junction data 140. Using the junction record, the node ID of the represented named intersection can be obtained (step 794). Using the node ID of the desired destination, the route calculation function 41 uses the route calculation data 136 to calculate a route to the desired destination (step 797).

EXAMPLE B

Figure 21:
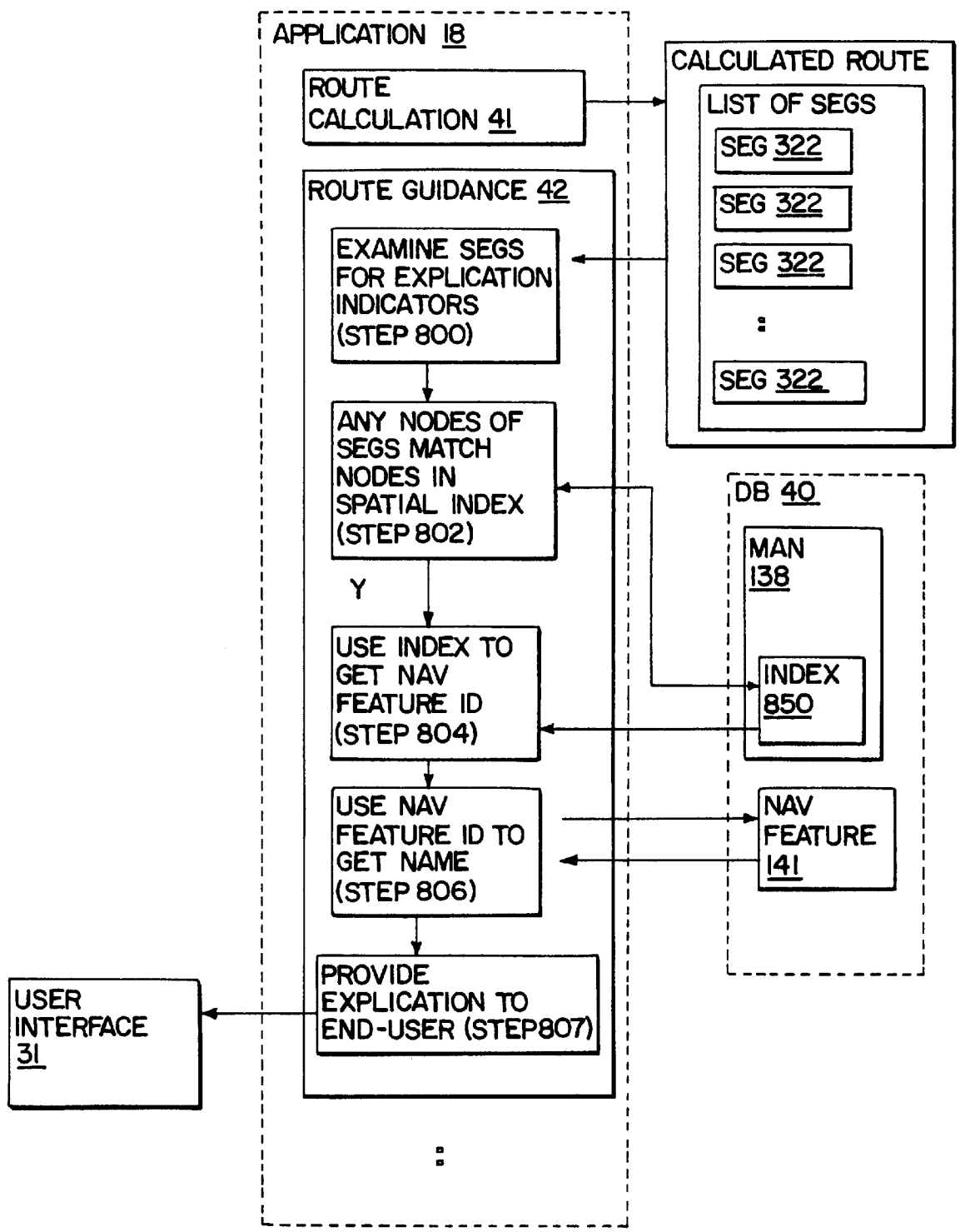
FIG. 21 is a flow chart illustrating a method for using a geographic database that supports named junctions for route guidance.

The junction data can be used to provide various other functions. For example, the junction data can be used to provide improved route explication during route guidance. An example of a method for providing this function is described in connection with FIG. 21.

After a route has been calculated by a route calculation function, such as the function 41 of FIG. 1, the end-user may be provided with guidance for following the route using the route guidance function 42 in FIG. 1. For example, the route guidance function 42 operates while the end-user is driving the calculated route. During operation of the route guidance function 42, the end-user (e.g., a driver) is provided with turn-by-turn directions for the maneuvers required to be taken to follow the calculated route as the route is being driven.

The route determined by the route calculation function 41 is comprised of a list of road segment records 322 (such as those shown in FIG. 9) that make up the calculated route. During the route guidance stage of operation, the maneuver data 138 (in FIG. 5) may be used. The maneuver data 138 include some of the data necessary to explicate a route for the end-user. During route guidance, the parcels of maneuver data that correspond to the geographic areas along which the calculated route passes are loaded and used to provide meaningful route guidance instructions or information to the end-user. Since the maneuver data are spatially parcelized, the parcels of maneuver data 138 that correspond to the geographic areas that encompass the calculated route are loaded and read. It is not necessary to provide the driver with instructions regarding each and every segment and node in the calculated route. Instead, various algorithms may be used to determine which maneuvers to explicate. The records in the calculated route are examined to determine when a maneuver should be explicated (step 800).

The road segment records 322 that form the calculated route identify the nodes at their end points, e.g. by node ID. These node ID's are compared to the node ID's in the spatial index 850 (of FIG. 15) included in each parcel of maneuver data 138. A match indicates that the calculated route passes through a named intersection. Using, the spatial index 850, the name of the named intersection can be obtained using the navigation feature ID associated with the entry for the node ID included in the index 850 (step 804). Using the navigation feature ID, the name of the node can be obtained from the navigation feature data 141 (step 806). Using this information, the route guidance function 42 can inform the end-user about the named intersection (step 807). For example, as the named intersection is being approached, the route guidance function 42 can synthesize an audible message stating that the "XYZ intersection" is directly ahead. The text "XYZ" is included in the navigation feature data 141. Providing this kind of information can be useful to the end-user.

In an alternative implementation, the list of segments that forms the calculated route is examined to ascertain the nodes linking all the segments in the route. These node records from the routing data 136 are loaded. Each of these node records 323 are examined to determine whether the named intersection flag, 370 or 370(S), has been set. If it has, the maneuver parcel that corresponds to the rectangular area encompassing the node is loaded. The navigation feature ID is obtained from the spatial index 850 located in the maneuver parcel. Using the navigation feature ID, the name of the intersection can be obtained from the navigation feature data 141. This alternative implementation has the advantage that the maneuver parcel the corresponds to a rectangular area encompassing a portion of calculated route may not have to be loaded unless there is a maneuver that needs to be explicated with respect to any of the segments or nodes contained in the parcel. For example if the driver is instructed to proceed straight on a road for the next 10 miles, it may not be necessary to load any of the maneuver parcels that represent the rectangular areas along these 10 miles even if there are numerous intersections (and therefore multiple nodes and segments) along the way. On the other hand if a named intersection is located along the route, it may be helpful to inform the driver to drive through the named intersection. The presence of the named intersection can be determined from the flag 370 or 370(S) in the node record 323. Because the flag indicates that the node is named, the maneuver parcel corresponding to the area encompassing the node is loaded to obtain the navigation feature ID from the spatial index 850. Then using the navigation feature data 141, the name of the intersection can be explicated to the driver.

V. METHODS FOR FORMING GEOGRAPHIC DATABASE EMBODIMENTS

The embodiments of the geographic database described above include (1) substitute representations of complex features, (2) a means by which named intersections can be identified or used by name, or (3) both substitute representations of complex features and a means by which named intersections can be identified or used by name. There are several methods by which substitute records can be formed to represent collections of complex features. Likewise, there are several methods by which names can be associated with named intersections so that the intersections can be identified by name. Some of these methods are described in connection with the examples set forth below.

EXAMPLE 1

A first example relates to a method for forming substitute representations of complex features. More specifically, this example relates to a method by which supernode data records can be formed to represent certain kinds of named complex intersections.

One of the factors involved in forming substitute records is identifying which geographic features should be represented by the substitute data record. In the case of forming, supernodes, one of the factors to be considered is to determine which segments and regular (non-super-) nodes are subsumed into the supernode record. One way to determine which segments and regular (non-super-) nodes to include in a supernode record is to examine each road segment and node manually. According to a manual process, a technician investigates the physical area represented by the segment and node records or a representation of the physical area. The technician uses a set of rules to identify which segments and nodes should be included in the supernode record. After applying this set of rules to identify the segments and nodes to be included in a supernode record, the supernode record is manually coded. The segments and nodes subsumed into the super-node record may also be coded manually as being subsumed. Although manually coding supernodes is effective, it can be time-consuming. In addition, when supernodes are manually coded, there is a possibility of inconsistent application of the rules.

EXAMPLE 2

Another way to form substitute records for certain complex intersections is to use the attributes of certain geographic features as indicators. The attributes used as indicators may have been stored in the database for another purpose unrelated to the formation of substitute data records. Using data attributes as indicators allows the complex intersection to be identified automatically, thereby facilitating the formation of substitute data records, such as super-node records, without the time-consuming manual effort. In addition, using attributes of certain geographic features as indicators also provides for the consistent formation of these substitute data records.

In one type of geographic database, supernode data records can be automatically formed to represent complex junctions of certain controlled access roads. In one kind of geographic database, segment data records that represent ramps that are associated with named junctions include attributes that identify them as such. Using these attributes as indicators, supernode records can be formed automatically to represent the named complex intersections associated with these ramps. A procedure for forming supernode records automatically is described in connection with FIG. 16. Source code for a program routine for forming substitute (e.g., supernode) data records is included in the appendix that forms part ofthis specification. This program routine can be used as an independent part of a compiler process for forming a geographic database. The program routine is prepared in the C programming language, although in alternative embodiments, other programming languages may be used.

Figure 16:
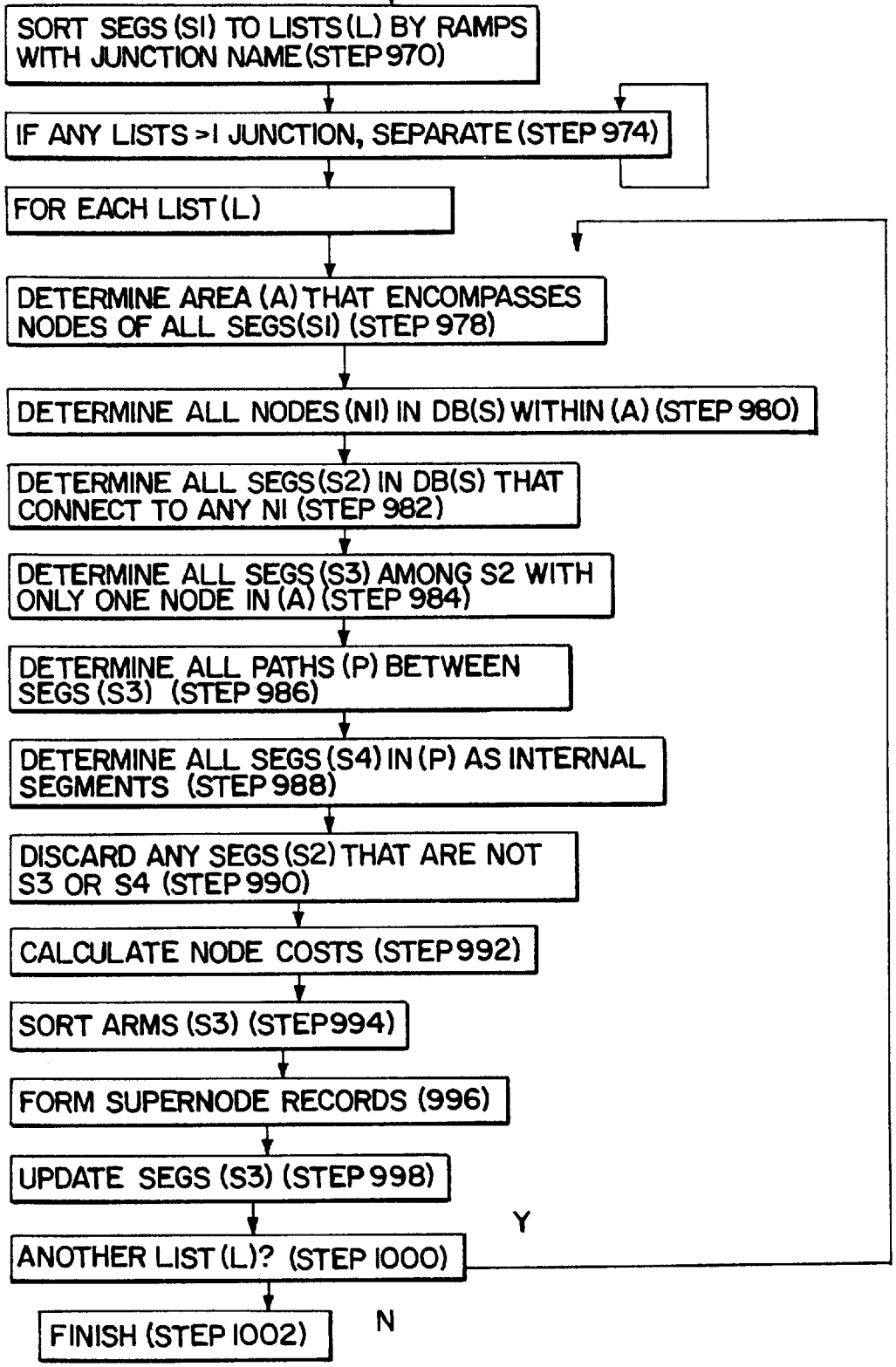
FIG. 16 is a diagram illustrating a process for forming, substitute records using, feature attributes of data records as indicators.
Figure 17:
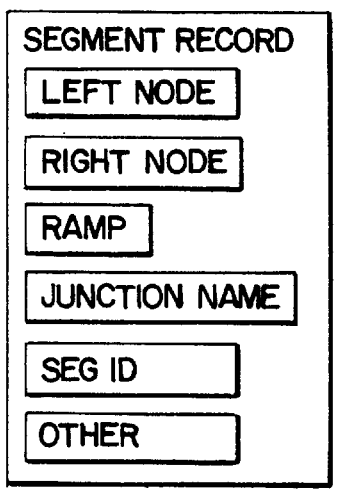
FIG. 17 is a diagram illustrating a segment data record that represents a ramp and that includes an attribute indicating that it is associated with a named junction of controlled access roads.

Referring to FIG. 16, to form supernodes automatically according to this procedure, it is assumed that data has been collected that represents the actual road segments and actual nodes in a geographic area. This collection of data is included in a source data file (DB(S)) 961, shown in FIG. 16. The source file 961 can be in any format, either proprietary or non-proprietary. This source data file 961 may represent the geographic data prior to being separated into types, layers, or parcels. In the source file 961, the data that represent road segments include various information about the road segments. This information is associated as attributes of each data record that represents a road segment. This attribute information may include the name of the road segment (if it has one). A data record that represents a road segment may also include attribute information that indicates what kind of road segment the data record represents. Examples of road segment types include ramps and controlled access roads. Roads to which traffic access is restricted to specific entrances, such as expressways, are controlled access roads and the data records that represent the road segments that form these kind of roads have attributes that indicate that they represent a controlled access road. Similarly, the ramps leading to or from a controlled access road are represented by data records that have an attribute that indicates that they are ramps. When a ramp leads to a named junction of controlled access roads, the segment data record that represents the ramp includes an attribute that it is associated with a named junction. This indication may be a flag, a name ID, or some other item of data that identifies the ramp as being associated with a named junction. An example of a segment data record that represents a ramp associated with a named junction of controlled access roads is shown in FIG. 17.

Referring again to FIG. 16, the source file 961 includes data records that represent navigable geographic features, including ramps as well as other road segments. Data records in the source file 961 that represent ramps associated with named junctions include an attribute indicating the name of the junction, such as shown in FIG. 17. To automatically generate supernode data records using a source file of geographic data, such as the source file 961, first, all the segment records in the source file are sorted (step 970) to find all the segment data records like those in FIG. 17 that represent ramps and that have a junction name associated with them. These records are sorted by the junction name.

From this sorting process, lists are generated for each group of segment records that have the same junction name. At this stage, the segment records in each list are checked to determine that the junction name with which they are associated refers to the same junction (step 974). It is possible that there is more than one junction with the same name located in the geographic region represented by the geographic data source file 961. Therefore, the segment records in each list are checked to confirm that they relate to the same named junction. The proximity of the segments to each other may be used for this purpose. According to one embodiment, if it is determined that the ramps in any one list relate to more than one named junction, the list may be discarded. Alternatively, if it is determined that the ramps in any one list relate to more than one named junction, the list is divided into two lists and each list is checked again until it is confirmed that each of the lists relates to only one named junction.

Figure 18A:
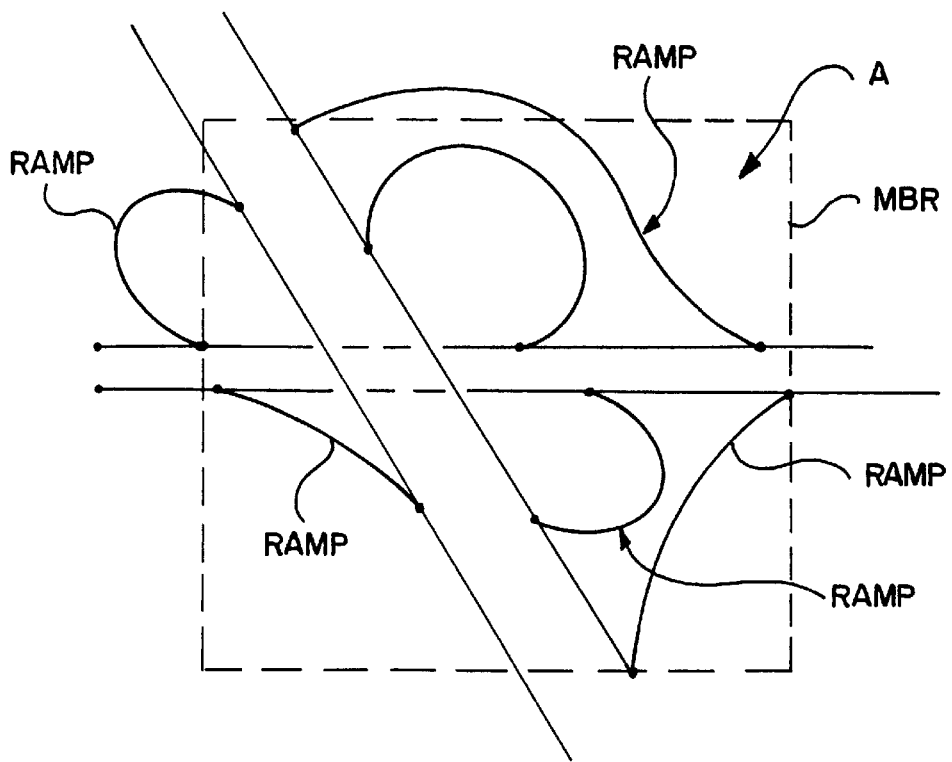
FIGS. 18A and 18B are diagrams illustrating formation of encompassing, geographic areas defined in connection with a step in the process illustrated in FIG. 16.
Figure 18B:
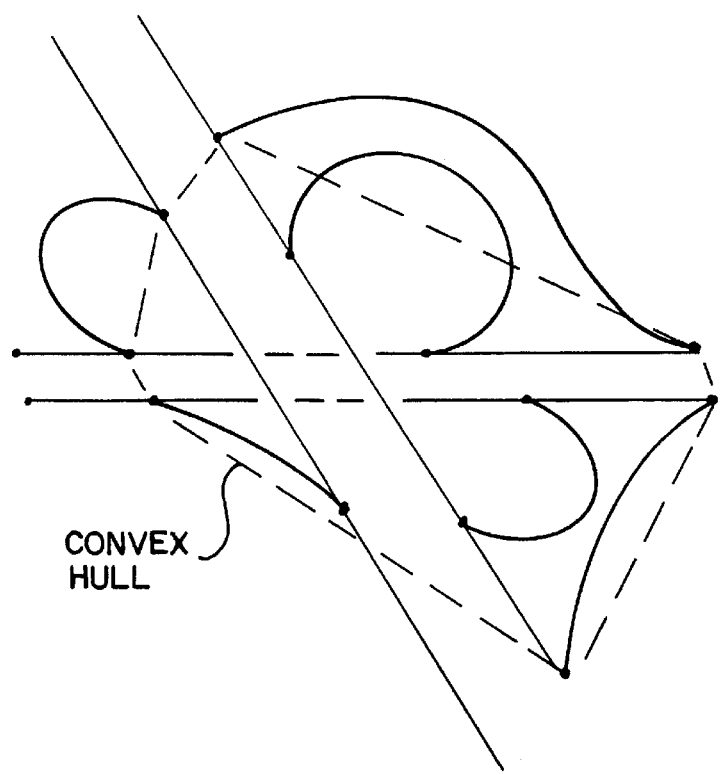

After it has been determined that each list relates to only one named junction, the segments on each of the lists are used in a process to form separate supernode records. For each list, the following steps are performed. First, the co-ordinates of the end points (nodes) of each of the segments on the list are determined. Using all these coordinates, a geometric area (A) encompassing all these nodes is determined (step 978). The geometric area may be a minimum bounding rectangle (MBR), a convex hull, or other geometric shape. A MBR is a rectangle whose sides are parallel with the geographic latitude and longitude lines and that has the minimum dimensions necessary to encompass all the points. A convex hull is a geometric shape formed by straight lines connecting those points necessary to encompass all the points within the shape. An example of a MBR is shown in FIG. 18A and an example of a convex hull is shown in FIG. 18B.

Using the encompassing geographic area (A), the source file 961 is searched to find all the node records that represent points located within the area (A) (step 980). All these nodes are candidates for being subordinate nodes of the supernode record. Next, all the segments that connect to these nodes are identified (step 982). A segment that has one endpoint (node) internal to the area (A) and its other endpoint (node) external to the area (A) is determined as a candidate arm of the supernode (step 984). (A supernode "arm" is one of the plurality of segments leading into or out of the supernode.) The nodes of these segments located inside the area (A) are boundary nodes of the supernode. (A boundary node of a supernode is a node that connects to one of the arins of the supernode.)

Next, all the paths through the supernode are calculated (step 986). Specifically, paths from each supernode arm to every other supernode arm are calculated. Every segment used in a successful path from one arm to another is potentially an internal segment of the supernode (step 988). Any candidate arm not connected (through a path of internal segments) to another arm is removed from the supernode (step 990). Any segments in a path that do not intersect a node that is attached to a segment marked as a junction are also removed. (This latter segments represent portions of roads that pass through an area of supernode, but do not connect directly the intersecting segments that form the supernode, thereby these latter segments do not necessarily belong to the supernode.)

Next, any links that are not used in the previous process are not internal to the supernode. All internal segments and nodes are identified. (In one embodiment, these internal segments and nodes are not used for any other supernode.)

After these paths are identified, node costs are determined (step 992). This provides a means to determine how much time (or other cost factor) should be allowed to traverse from one arm to another. In addition, the arms of the supernode are sorted (step 994). The arms of a supernode are sorted so that they can be stored in the supernode record in a known order. In one embodiment, the arms of a supernode are sorted so that they are ordered the same manner as the arms of a regular (non-super-) node record. This sorting may be done in any suitable consistent manner, such as clockwise from due north. This facilitates using the supernode (or non-super-node) record for route calculation purposes, for example when finding successor segments of the supernode (or non-super-node).

With this information, a supernode record is formed (step 996). This supernode record includes some or all of the information shown in the supernode record illustrated in FIG. 11 at 323(S). This supernode record is added to the routing subset 136. As mentioned above, the supernode record is used for routing instead of the non-supernode records. Thus, those segments records that connect to the arms of the supernode are modified to indicate that one of their end points is the supernode instead of the regular node (step 998).

The above process (steps 978–998) is performed for each of the lists of segments representing ramps associated with named junctions (step 1000).

This process described above has the advantage that supernode records can be generated automatically using the coding of ramps with junction names which has already been done for an unrelated purpose. In addition, this process assures that all the proper segments and nodes are incorporated into the supernode record even if they have not been identified as ramps associated with named junctions. This facilitates various of the navigation functions, such as route calculation and route guidance.

The procedure described above can be extended to other formats of geographic databases. The procedure described above can also be extended to other kinds of indicator data that can be used to identify locations at which substitute data records can be used to represent geographic features that are already represented by data records that correspond to the actual physical geographic features. In particular, the procedure described above can be extended to use various kinds of indicator data to identify complex intersections. Once these complex intersections are identified, supernode data records, or other kinds of substitute records, may be formed to represent these complex intersections. Using indicators for complex intersections, potential locations for supernode records, or other kinds of substitute records, can be identified and supernode records, or other kinds of substitute records, can be generated automatically.

EXAMPLE 3

One kind of data that can be used as an indicator for a complex intersection is included in the GDF (Geographic Data Files) standard developed by the CEN (European Committee on Standardisation). The GDF is a standard for representation of geographic data. The GDF defines multiple levels of representation for cartographic data. Level 0 includes the geometry of a map in terms of cartographic primitives. Level 1 describes the map in terms of simple features, such as "road elements" or "junctions." Level 2 is a map representation formed of complex features. The complex features included in level 2 are composites of simple features. In the terminology of the GDF, an "intersection" is a level 2 representation. An "intersection" is a complex feature formed of a composite group of "road elements" and "junctions."

With a geographic database in the GDF format, level 2 "intersections" can be used as indicators of complex intersections. A procedure for forming supernode records automatically using a source file in GDF format is described in connection with FIG. 19. The procedure for automatically forming supernode records using a source file in a GDF format is similar to the procedure described above in connection with FIG. 16 for forming supernode records. In the GDF format, road segments (or "road elements" in the GDF terminology) that form part of a level 2 intersection in the GDF may include an attribute that identifies them as part of the level 2 intersection. This attribute may be used in a manner similar to the named junction attribute described in Example 2, above. Alternatively, a GDF data file may include a list of level 2 intersections each of which identifies the simple features, e.g. the "road elements" and "junctions" of which it is a composite. This information may be used in a similar manner.

Figure 19:
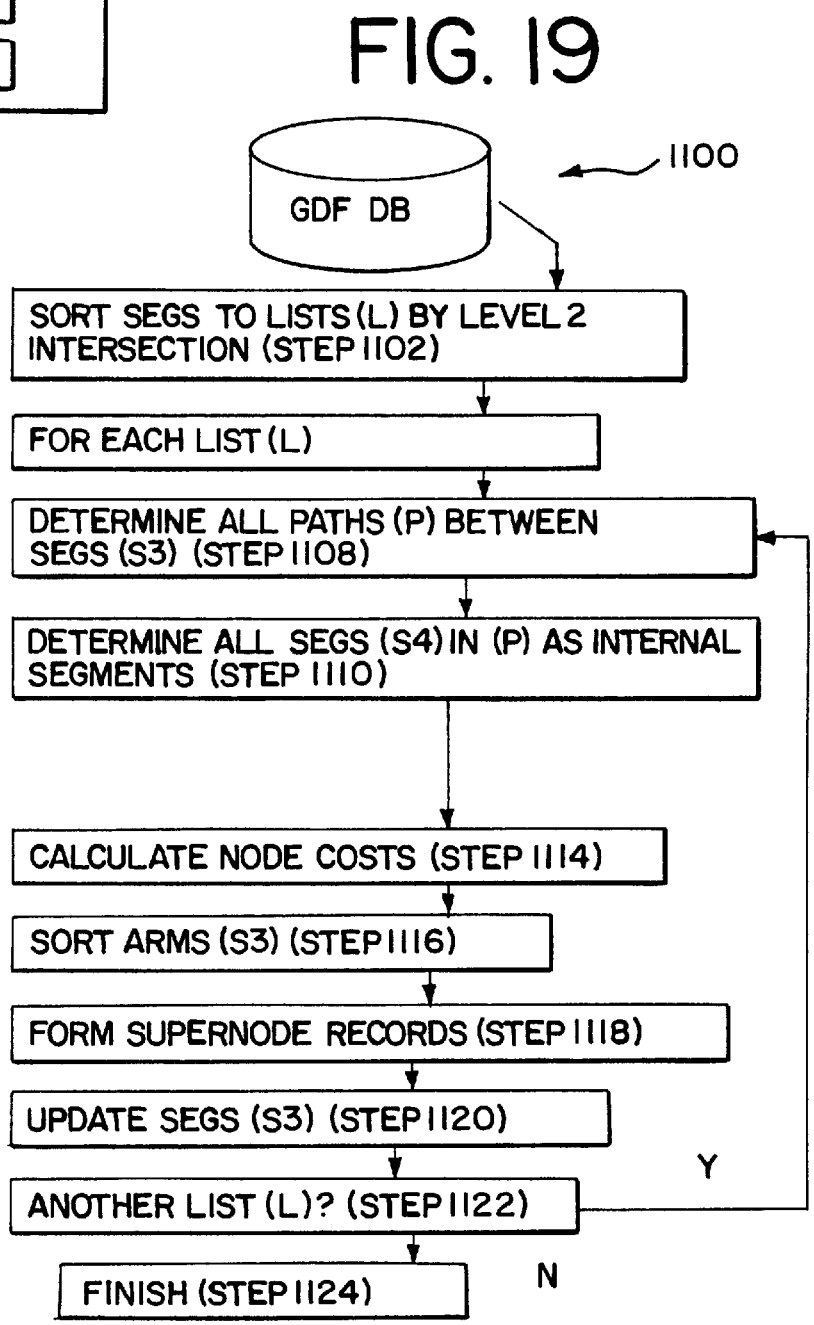
FIG. 19 is a diagram illustrating another process for forming, substitute records using, feature attributes of data records as indicators.

As shown in FIG. 19, a source file 1100 includes data records that represent segments of roads. The source file 1100 is in the GDF format. Data records in the source file 1100 that are associated with a level 2 intersection include an attribute indicating such association. Using this attribute, the segments in the source file 1100 are sorted by level 2 intersection to identify all the road segment records that are associated with each level 2 intersection (step 1102). (Note that level 2 intersections in the GDF format are not necessarily named junctions of controlled access roads. Therefore, the segments identified by the sorting of the source file 1100 in FIG. 19 are not necessarily the same as those segments identified by sorting of the source file 961 in FIG. 16.

Once all these segment records are identified, the segment records that correspond to each of the different level 2 intersections are separated into separate lists. Forming supernode records starting with a source file in a GDF format may be simpler in some respects that forming supernode records starting with a source file as described in FIG. 16 because the need to form a bounding area (step 978) and then identify which road components to include (steps 980–984) may be omitted. Using the GDF format, the road features (i.e., "road elements" and "junctions" in GDF terminology) identified as associated with the level 2 intersection are taken as corresponding to the supernode.

The remainder of the steps used to form supernode records from the GDF source file 1100 may be similar to steps 980–1000 in FIG. 16. As in the method describe in connection with FIG. 16, once all the records to be associated with the supernode record are identified, all paths are determined (step 1108), internal segments are identified (step 1110), node costs are calculated (step 1114), the arms are sorted (step 116), the supernode record is formed and stored (step 1118), and the segments corresponding to the arms are updated to indicate their connection to the supernode entity (step 1120).

Alternatively, the GDF file 1100 may include data records for level 2 "intersections." Each of these data records identifies the "road elements" (which correspond to segments) from which it is composed. These "road elements" for each of the level 2 intersections are then used to form the separate lists (step 1102) in FIG. 19. The remainder of the steps would be similar to those described above.

As mentioned above, the process used to form substitute data records to represent complex intersections may be used with data in any kind of proprietary or non-proprietary format.

VI. ALTERNATIVE EMBODIMENTS

In alternative embodiments, named intersections may be represented by either a supernode data record or a non-supernode record. In some alternative embodiments, it may be preferable to provide for named intersections only for nodes represented by supernodes.

In the above embodiments, the geographic database was described as parcelized. In alternative embodiments, the geographic database may be organized other than in parcels.

In the embodiments disclosed above, support for named intersections was described in connection with a navigation system. In alternative embodiments, the navigation system should be understood to include any computer-based system that provides navigation functions to an end-user regardless of hardware platform or architecture. For example, the navigation system may include any kind of portable system, such as hand-held systems or systems installed on personal digital assistants or personal computers. In alternative embodiments, the navigation system may include navigation application software installed on a personal computer, such as a desktop computer. Further, the navigation system may be implemented in various different environments, including networked environments and client-server platform environments. The navigation application program and the geographic database need not be located in the same location, but may connected over a network. The geographic database may be located remotely from the end user and the data transmitted to the end-user over a wireless network. In addition, all or a portion of the software may be remotely located.

Other terminology may be used to refer to the physical features or to the data that represent the physical features. It is understood that the subject matter disclosed herein is not limited to any particular terminology that expresses similar concepts. It is intended that the foregoing detailed description be regarded as illustrative rather than limiting and that it is understood that the following claims including all equivalents are intended to define the scope of the invention.

We claim:

1. A geographic database stored on a computer readable medium and used in a navigation system, wherein the geographic database includes data that represent components of a road network in a geographic region wherein the components of the road network include intersections, and wherein the geographic database comprises:
   a first plurality of data entities each of which represents an intersection of roads in the road network;
   a second plurality of data entities each of which represents a name of one of said components of said road network; and
   a third plurality of data entities each of which associates one of said first plurality of data entities with one of said second plurality of data entities.

2. The invention of claim 1 wherein each of said third plurality of data entities identifies at least one of a fourth plurality of data entities, wherein each of said fourth plurality of data entities represents an administrative place.

3. The invention of claim 2 wherein each of said administrative place comprises one of a city, state, county, and country.

4. The invention of claim 2 further comprising:
   a first index that identifies each of said third plurality of data entities by one of said fourth plurality of data entities and one of said second plurality of data entities associated therewith.

5. The invention of claim 4 further comprising:
   a second index that identifies each of said third plurality of data entities by one of said second plurality of data entities associated therewith.

6. The invention of claim 5 further comprising:
   a third index that identifies each of said third plurality of data entities spatially.

7. The invention of claim 6 wherein said third index is included among a fifth plurality of data entities that include maneuver guidance data.

8. The invention of claim 4 further comprising:
   a spatial index that identifies each of said third plurality of data entities by its geographical coordinates.

9. The invention of claim 1 further comprising:
   a spatial index that identifies each of said third plurality of data entities by its geographical coordinates.

10. The invention of claim 1 wherein said geographic database is parcelized into a plurality of parcels, each of which includes a plurality of data entities.

11. The invention of claim 1 wherein said first plurality of data entities are organized into a plurality of parcels each of which contains a plurality of said data entities which represent roads,
    wherein said second plurality of data entities are organized into a plurality of parcels each of which contains a plurality of data entities which represent names of components of said road network, and
    wherein said third plurality of data entities are organized into a plurality of parcels each of which contains a plurality of said data entities which associate one of said first plurality of data entities with one of said second plurality of data entities.

12. The invention of claim 1 wherein said first plurality of data entities are spatially ordered.

13. The invention of claim 1 wherein said first plurality of data entities are ordered in Peano key order.

14. The invention of claim 1 further comprising:
    an index that identifies each of said third plurality of data entities by one of said second plurality of data entities associated therewith.

15. The invention of claim 1 further comprising:
    a spatial index that identifies each of said third plurality of data entities by its geographical coordinates.

16. The invention of claim 1 wherein said second plurality of data entities are ordered in alphabetical order.

17. The invention of claim 1 wherein said third plurality of data entities are ordered by administrative place.

18. The invention of claim 1 wherein said third plurality of data entities are organized alphabetically by administrative place.

19. The invention of claim 1 wherein said first plurality of data entities represent complex intersections having names.

20. A method of using names for intersections using a navigation application program, wherein the names for intersections are represented by data records in a geographic database stored on a computer readable medium, wherein the geographic database represents a road network of a geographic region, wherein the method comprises the steps of:
    providing data records in said geographic database specifying names for navigable features including roads and intersections of said road network;
    providing data records in said geographic database specifying road segments of said road network and intersections of said road segments; and
    providing data records in said geographic database representing named intersections, wherein each of said data records representing named intersections associates one of said data records specifying names for navigable features with one of said data records specifying intersections of road segments.

21. A geographic database architecture for use with a navigation application program that provides navigation features to an end user wherein the geographic database includes a plurality of data entities that represent geographic features in a geographic region, said geographic database architecture comprising:
    route calculation data comprised of a plurality of segment data records and a plurality of node data records, wherein each segment data record represents a portion of a road in said geographic region and each node data record represents an end point of a portion of a road, and wherein said route calculation data include attributes which include the routing characteristics of the portions of roads represented thereby and intersections thereof;
    navigation feature data comprised of a plurality of data records each of which represents a name of a geographic feature; and junction data comprised of a plurality of data records each of which relates one of said node data records with one of said data records of said navigation feature data.

22. A method of operating a navigation system to provide route guidance for a route wherein the route is comprised of a list of data records in a geographic database and wherein the data records represent navigable geographic features along the route, the method comprising the steps of:

examining data that represents an intersection along said route to determine whether the data includes an indication that the intersection represented thereby is named;

for each of said data that includes said indication, using an index into a list of names for navigable features to ascertain a name for said intersection; and explicating said name.

23. The method of claim 22 wherein said index associates an identifier for a data record representing an intersection with an identifier for a data record representing a name.

24. The method of claim 22 wherein the data records in the list of data records represent segments of roads, and wherein the method further comprises:

using said data records that represent segments of roads in said list of data records to identify each data that represents an intersection along said route.

25. A method of operating a navigation system to provide route guidance for a route wherein the route is comprised of a list of segment data records in a geographic database and wherein the segment data records represent segments of roads along the route between a first location and a second location and wherein each represented segment of a road has two endpoints, each of which is identified by a node data record having a node data record ID, the method comprising the steps of:

for each node data record ID associated with an end point of a segment represented on said list, comparing said node data record ID with node data record ID's in an index wherein said index associates node data record ID's with names for the intersections represented thereby; and explicating said name.

26. The method of claim 25 wherein said index associates each node data record ID included therein with a record ID for a record that represents a name for a navigable feature, and wherein the method further comprises the step of:

using the record ID for the name of a navigable feature associated with each node record ID in said index that matches a node record ID associated with a node data record that represents an intersection along said route to find a name associated therewith.

27. The method of claim 25 wherein said index is a spatial index.

28. The method of claim 25 wherein said index comprises a plurality of indices, each one of which is located in a separate one of plurality of spatially organized parcels of data.

29., A method of automatically forming substitute records to represent complex intersections in a geographic database that represents physical geographic features in a geographic region, comprising the steps of:

identifying a first group of records among data records in a source geographic data file wherein each record in the first group includes a feature indicator specific to complex intersections;

dividing said first group of records into a plurality of second groups of records wherein each of said second groups includes records of said first group associated with a different one of a plurality of complex intersections located in the geographic region;

for each of said second groups, identifying all the navigable paths through the complex intersection associated with the first group of records included in the second group; and forming a substitute data record to represent the complex intersection associated with the first group of records included in the second group, wherein the substitute data record includes data identifying the navigable paths.

30. The method of claim 29 further comprising the steps of:

for each of said second groups, prior to identifying all the navigable paths between each of the road segments, defining a geographic area that encompasses the features represented by the records of the first group included in the second group;

identifying a third group of data records, wherein said third group comprises data records in said geographic database that represent features including in said defined geographic area in addition to those represented by data records of said first group included in said second group;

augmenting said first group of data records included said second group to include said third group of data records when identifying all the navigable paths through the complex intersection.

31. The method of claim 30 further comprising the step of:

after augmenting said first group, identifying those road segments represented by said augmented first group of data records that have one of their endpoints in said defined area and the other of said endpoints outside said defined area, and using those road segments as arms through which the navigable paths through the complex intersection are determined.

32. The method of claim 29 wherein said source geographic data file is in a GDF format.

33. The method of claim 29 wherein said feature indicator is a name for an intersection.

34. The method of claim 29 wherein said feature indicator is a level 2 intersection.

* * * * *